(12) United States Patent
Zheng et al.

(10) Patent No.: US 10,958,364 B2
(45) Date of Patent: Mar. 23, 2021

(54) DATA TRANSMISSION METHOD, DEVICE, AND SYSTEM

(71) Applicant: Huawei Technologies Co., Ltd., Guangdong (CN)

(72) Inventors: Juan Zheng, Beijing (CN); Zhiyu Yan, Shenzhen (CN); Qiang Li, Shenzhen (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/728,263

(22) Filed: Oct. 9, 2017

(65) Prior Publication Data
US 2018/0041295 A1 Feb. 8, 2018

Related U.S. Application Data

(63) Continuation of application No. PCT/CN2015/076383, filed on Apr. 10, 2015.

(51) Int. Cl.
*H04B 17/382* (2015.01)
*H04B 7/26* (2006.01)
(Continued)

(52) U.S. Cl.
CPC .............. *H04B 17/382* (2015.01); *H04B 7/26* (2013.01); *H04L 5/00* (2013.01); *H04W 72/0446* (2013.01); *H04L 5/0057* (2013.01)

(58) Field of Classification Search
CPC ... H04B 17/382; H04B 7/26; H04W 72/0446; H04L 5/0057; H04L 5/00
(Continued)

(56) References Cited

U.S. PATENT DOCUMENTS 6,404,756 B1 * 6/2002 Whitehill ............... H04L 43/00
370/338
8,213,438 B2 * 7/2012 Larsen ............... H04W 40/246
370/400
(Continued)

FOREIGN PATENT DOCUMENTS

| CN | 1929337 A | 3/2007 |
|---|---|---|
| CN | 101188816 A | 5/2008 |

(Continued)

OTHER PUBLICATIONS

Intel Corporation (Hidden Node Problem and Potential Remedies for LAA Downlink) (Year: 2015).*
(Continued)

*Primary Examiner* — Jae Y Lee
*Assistant Examiner* — Jean F Voltaire
(74) *Attorney, Agent, or Firm* — Slater Matsil, LLP

(57) ABSTRACT

The present disclosure discloses a data transmission method, a device, and a system, relates to the communications field, and can resolve a prior-art problem that a receive end cannot correctly receive data because a starting moment of sending information on a license-exempt spectrum cannot be determined. A specific solution is as follows: A first device detects first information of a first serving cell in a preset time period of a first subframe on a first time resource or a first time set of a subframe on a first time resource, determines a starting position of a second time resource according to the first information, and detects second information of the first serving cell in a second time set of a subframe on the second time resource. The present disclosure is used for data transmission.

8 Claims, 9 Drawing Sheets

(51) Int. Cl.
*H04L 5/00* (2006.01)
*H04W 72/04* (2009.01)

(58) Field of Classification Search
USPC .......................................................... 370/252
See application file for complete search history.

(56) References Cited

U.S. PATENT DOCUMENTS

| | | | |
|---|---|---|---|
| 2005/0025265 A1* | 2/2005 | D'Amico | H04W 16/14 375/346 |
| 2005/0135242 A1* | 6/2005 | Larsen | H04W 88/04 370/229 |
| 2008/0170648 A1 | 7/2008 | Wu | |
| 2012/0033650 A1* | 2/2012 | Ahn | H04L 5/0091 370/336 |
| 2012/0307744 A1 | 12/2012 | Charbit et al. | |
| 2012/0320806 A1 | 12/2012 | Ji et al. | |
| 2013/0155917 A1 | 6/2013 | Hu et al. | |
| 2013/0294399 A1* | 11/2013 | Lee | H04W 4/70 370/330 |
| 2015/0131536 A1 | 5/2015 | Kaur et al. | |
| 2015/0304017 A1 | 10/2015 | Zhuang et al. | |
| 2015/0358996 A1 | 12/2015 | Fang et al. | |
| 2016/0219441 A1* | 7/2016 | Park | H04W 74/0816 |
| 2016/0255625 A1* | 9/2016 | Kim | H04W 74/04 370/336 |
| 2016/0373281 A1 | 12/2016 | Ji et al. | |

FOREIGN PATENT DOCUMENTS

| | | |
|---|---|---|
| CN | 102217212 A | 10/2011 |
| CN | 102387543 A | 3/2012 |
| CN | 103370896 A | 10/2013 |
| CN | 103875187 A | 6/2014 |
| CN | 104486013 A | 4/2015 |
| KR | 20120140189 A | 12/2012 |
| KR | 102031031 B1 | 10/2019 |
| WO | 2014035415 A1 | 3/2014 |
| WO | 2014107994 A1 | 7/2014 |
| WO | 2014189909 A2 | 11/2014 |

OTHER PUBLICATIONS

Intel Corporation (Hidden Node Problem and Potential Remedies for LAA Downlink), 3 pages (Year: 2015).*

Intel Corporation; "Hidden Node Problem and Potential Remedies for LAA Downlink"; 3GPP TSG RAN WG1 Meeting Ad-hoc; R1-151106; Paris, France; Mar. 24-26, 2015; 3 pages.

"3rd Generation Partnership Project; Technical Specification Group Radio Access Network; Evolved Universal Terrestrial Radio Access (E-UTRA); Physical layer procedures(Release 12)," 3GPP TS 36.213 V12.5.0 (Mar. 2015), Technical Specification, Mar. 2015, 239 pages.

"Broadband Radio Access Networks (BRAN);5 GHz high performance RLAN; Harmonized EN covering the essential requirements of article 3.2 of the RandTTE Directive", ETSI EN 301 893 V1.8.1 (Mar. 2015), Harmonized European Standard, Mar. 2015, 93 pages.

Alcatel-Lucent, et al., "LBT and Frame Structure Design for LAA," R1-151071 (Revision of R1-150191), 3GPP TSG RAN WG1 LAA Meeting (Ad Hoc), Paris, France, Mar. 24-26, 2015, 7 pages.

Mediatek Inc. et al., "Design consideration on fractional subframe at the end of DL transmission," 3GPP TSG RAN WG1 LAA Ad Hoc Meeting, R1-151062, Paris, France, Mar. 24-26, 2015, 7 pages.

NEC, "Symbol Level Transmission in LAA," 3GPP TSG RAN WG1 Ad-hoc Meeting, R1-151118, Paris, France, Mar. 24-26, 2015, 3 pages.

* cited by examiner

DATA TRANSMISSION METHOD, DEVICE, AND SYSTEM

CROSS-REFERENCE TO RELATED APPLICATIONS

This application is a continuation of International Application No. PCT/CN2015/076383, filed on Apr. 10, 2015, the disclosure of which is hereby incorporated by reference in its entirety.

TECHNICAL FIELD

The present application relates to the communications field, and in particular, to a data transmission method, a device, and a system.

BACKGROUND

In a wireless communications network, each device needs to transmit information by using a frequency resource, and the frequency resource is referred to as a spectrum. The spectrum may be categorized into a licensed spectrum and an unlicensed spectrum, and the unlicensed spectrum is called a license-exempt spectrum. The licensed spectrum is some operator-dedicated frequency resources, and the license-exempt spectrum is common frequency resources in the wireless communications network. With development of communications technologies, an amount of transmitted information in the wireless communications network is ever-increasing, and using a license-exempt spectrum to transmit information can improve a data throughput in the wireless communications network, and better meet a user requirement.

However, when a device preempts a license-exempt spectrum to transmit information, a moment of preempting the spectrum is random, that is, a starting moment of sending the information by the device by using the license-exempt spectrum is random. Therefore, a receive end cannot correctly receive data because the starting moment of sending the information on the license-exempt spectrum cannot be determined.

SUMMARY

Embodiments of the present disclosure provide a data transmission method, a device, and a system, so as to resolve a prior-art problem that a receive end cannot correctly receive data because a starting moment of sending information on a license-exempt spectrum cannot be determined.

To achieve the foregoing objective, the following technical solutions are used in the embodiments of the present disclosure:

According to a first aspect, an embodiment of the present disclosure provides a first device, including:

a first detection unit, configured to detect first information of a first serving cell in a preset time period of a first subframe on a first time resource or a first time set of a subframe on the first time resource, where the first time set is a set of predefined starting positions of the first information in a subframe, and the first time set includes at least two elements;

a management unit, configured to determine a starting position of a second time resource according to the first information detected by the first detection unit; and a second detection unit, configured to detect second information of the first serving cell in a second time set of a subframe on the second time resource, where the second time set is a set of predefined starting positions of the second information in a subframe, and the first time set and the second time set include at least one different element.

With reference to the first aspect, in a first possible implementation manner of the first aspect, the first time resource includes a close period of the first serving cell, and the close period of the first serving cell is a time period in which the first serving cell does not preempt an unlicensed spectrum; and the second time resource is included in an open period of the first serving cell, and the open period of the first serving cell is a time period in which the first serving cell occupies an unlicensed spectrum.

With reference to the first aspect or the first possible implementation manner of the first aspect, in a second possible implementation manner of the first aspect, the first detection unit is further configured to: detect third information, and determine a starting position of the first information according to the detected third information, where the third information is received after the first information; and detect the received first information according to the starting position of the first information in the preset time period of the first subframe on the first time resource or the first time set of the subframe on the first time resource.

With reference to any one of the first aspect, or the first to the second possible implementation manners of the first aspect, in a third possible implementation manner of the first aspect, the first subframe in each frame period is the first subframe, the preset time period includes at least one orthogonal frequency division multiplexing OFDM symbol in the first subframe, and a frame period includes at least two subframes.

With reference to the third possible implementation manner of the first aspect, in a fourth possible implementation manner of the first aspect, the frame period is a fixed frame period FFP in a frame based equipment FBE frame structure; and the first subframe meets a formula: I mod F=offset, where I is a subframe index of the first subframe, F is a length of the fixed frame period FFP, and offset is an offset.

With reference to any one of the first aspect, or the first to the second possible implementation manners of the first aspect, in a fifth possible implementation manner of the first aspect, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

With reference to any one of the first aspect, or the first to the fifth possible implementation manners of the first aspect, in a sixth possible implementation manner of the first aspect, the first time set includes a starting moment of at least one orthogonal frequency division multiplexing OFDM symbol in a subframe; or the first time set includes a starting moment of at least 1/T OFDM symbols in a subframe, and T is an integer greater than 0.

With reference to any one of the first aspect, or the first to the sixth possible implementation manners of the first aspect, in a seventh possible implementation manner of the first aspect, the first time set includes a starting position of the $(k+x)^{th}$ OFDM symbol in a subframe, where a value of k includes at least one of 3, 4, 5, 6, 8, 9, or 12, x represents a quantity of OFDM symbols occupied by a preamble sequence, a value of x is 0, 1, 2, 3, or 4, and $1 \leq k+x \leq 14$.

With reference to any one of the first aspect, or the first to the seventh possible implementation manners of the first aspect, in an eighth possible implementation manner of the first aspect, the starting position of the second time resource is a starting moment of the $n^{th}$ data transmission unit following the starting position of the first information, n is a positive integer, the data transmission unit is 1/T OFDM symbols, and T is an integer greater than 0.

With reference to any one of the first aspect, or the first to the eighth possible implementation manners of the first aspect, in a ninth possible implementation manner of the first aspect, the first device further includes a third detection unit, configured to detect duration information; and the management unit is further configured to determine an ending moment of the second time resource according to the duration information detected by the third detection unit.

With reference to the ninth possible implementation manner of the first aspect, in a tenth possible implementation manner of the first aspect, the duration information includes information about a first length, and the first length is a length of the last subframe on the second time resource.

With reference to the ninth possible implementation manner of the first aspect or the tenth possible implementation manner of the first aspect, in an eleventh possible implementation manner of the first aspect, the first device detects at least two pieces of duration information of the first serving cell; and the management unit is further configured to determine the ending moment of the second time resource according to the last piece of detected duration information.

With reference to the ninth possible implementation manner of the first aspect or the tenth possible implementation manner of the first aspect, in a twelfth possible implementation manner of the first aspect, the duration information is carried on a control channel in a second subframe, and the second subframe includes at least one of a subframe on the second time resource or a subframe that is in a second serving cell and is corresponding to the last subframe on the second time resource.

With reference to the ninth possible implementation manner of the first aspect or the tenth possible implementation manner of the first aspect, in a thirteenth possible implementation manner of the first aspect, the duration information is carried in the last subframe on the second time resource.

With reference to any implementation manner of the ninth possible implementation manner of the first aspect to the thirteenth possible implementation manner of the first aspect, in a fourteenth possible implementation manner of the first aspect, the duration information is carried on a physical layer common control channel.

According to a second aspect, an embodiment of the present disclosure provides a second device, including:

a management unit, configured to determine, in a preset time period of a first subframe on a first time resource or a first time set of a subframe on the first time resource, a starting position of sending first information of a first serving cell, where the first time set is a set of predefined starting positions of the first information in a subframe, and the first time set includes at least two elements; and a sending unit, configured to send the first information to a first device, where the management unit is further configured to: determine a starting position of the second time resource according to the first information; and determine, in a second time set of a subframe on the second time resource, a starting position of sending second information of the first serving cell, where the second time set is a set of predefined starting positions of the second information in a subframe, and the first time set and the second time set include at least one different element; and the sending unit is further configured to send the second information to the first device.

With reference to the second aspect, in a first possible implementation manner of the second aspect, the first time resource includes a close period of the first serving cell, and the close period of the first serving cell is a time period in which the first serving cell does not preempt an unlicensed spectrum; and the second time resource is included in an open period of the first serving cell, and the open period of the first serving cell is a time period in which the first serving cell occupies an unlicensed spectrum.

With reference to the second aspect or the first possible implementation manner of the second aspect, in a second possible implementation manner of the second aspect, the sending unit is further configured to send third information to the first device, where the third information is used to indicate the starting position of the first information.

With reference to any one of the second aspect, or the first to the second possible implementation manners of the second aspect, in a third possible implementation manner of the second aspect, the first subframe in each frame period is the first subframe, the preset time period includes at least one orthogonal frequency division multiplexing OFDM symbol in the first subframe, and a frame period includes at least two subframes.

With reference to the third possible implementation manner of the second aspect, in a fourth possible implementation manner of the second aspect, the frame period is a fixed frame period FFP in a frame based equipment FBE frame structure; and the first subframe meets a formula: I mod F=offset, where I is a subframe index of the first subframe, F is a length of the fixed frame period FFP, and offset is an offset.

With reference to any one of the second aspect, or the first to the second possible implementation manners of the second aspect, in a fifth possible implementation manner of the second aspect, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

With reference to any one of the second aspect, or the first to the fifth possible implementation manners of the second aspect, in a sixth possible implementation manner of the second aspect, the first time set includes a starting moment of at least one orthogonal frequency division multiplexing OFDM symbol in a subframe; or the first time set includes a starting moment of at least 1/T OFDM symbols in a subframe, and T is an integer greater than 0.

With reference to any one of the second aspect, or the first to the sixth possible implementation manners of the second aspect, in a seventh possible implementation manner of the second aspect, the first time set includes a starting position of the $(k+x)^{th}$ OFDM symbol in a subframe, where a value of k includes at least one of 3, 4, 5, 6, 8, 9, or 12, x represents a quantity of OFDM symbols occupied by a preamble sequence, a value of x is 0, 1, 2, 3, or 4, and $1 \leq k+x \leq 14$.

With reference to any one of the second aspect, or the first to the seventh possible implementation manners of the second aspect, in an eighth possible implementation manner of the second aspect, the starting position of the second time resource is a starting moment of the $n^{th}$ data transmission unit following the starting position of the first information, n is a positive integer, the data transmission unit is 1/T OFDM symbols, and T is an integer greater than 0.

With reference to any one of the second aspect, or the first to the eighth possible implementation manners of the second aspect, in a ninth possible implementation manner of the second aspect, the management unit is further configured to determine an ending moment of the second time resource; and the sending unit is further configured to send duration information to the first device, where the duration information is used to indicate a time length from a starting moment of the duration information to the ending moment of the second time resource.

With reference to the ninth possible implementation manner of the second aspect, in a tenth possible implementation manner of the second aspect, the duration information includes information about a first length, and the first length is a length of the last subframe on the second time resource.

With reference to the ninth possible implementation manner of the second aspect or the tenth possible implementation manner of the second aspect, in an eleventh possible implementation manner of the second aspect, the sending unit is further configured to send at least two pieces of duration information of the first serving cell to the first device.

With reference to the ninth possible implementation manner of the second aspect or the tenth possible implementation manner of the second aspect, in a twelfth possible implementation manner of the second aspect, the duration information is carried on a control channel in a second subframe, and the second subframe includes at least one of a subframe on the second time resource or a subframe that is in a second serving cell and is corresponding to the last subframe on the second time resource.

With reference to the ninth possible implementation manner of the second aspect or the tenth possible implementation manner of the second aspect, in a thirteenth possible implementation manner of the second aspect, the duration information is carried in the last subframe on the second time resource.

With reference to any implementation manner of the ninth possible implementation manner of the second aspect to the thirteenth possible implementation manner of the second aspect, in a fourteenth possible implementation manner of the second aspect, the duration information is carried on a physical layer common control channel.

According to a third aspect, an embodiment of the present disclosure provides a first device, including:

a detection unit, configured to detect duration information; and a management unit, configured to determine an ending moment of the second time resource according to the duration information detected by the detection unit.

With reference to the third aspect, in a first possible implementation manner of the third aspect, the second time resource is included in an open period of the first serving cell, and the open period of the first serving cell is a time period in which the first serving cell occupies an unlicensed spectrum.

With reference to the third aspect or the first possible implementation manner of the third aspect, in a second possible implementation manner of the third aspect, the duration information includes information about a first length, and the first length is a length of the last subframe on the second time resource.

With reference to any one of the third aspect, or the first to the second possible implementation manners of the third aspect, in a third possible implementation manner of the third aspect, the first device detects at least two pieces of duration information of the first serving cell; and the management unit is further configured to determine the ending moment of the second time resource according to the last piece of detected duration information.

With reference to any one of the third aspect, or the first to the second possible implementation manners of the third aspect, in a fourth possible implementation manner of the third aspect, the duration information is carried on a control channel in a second subframe, and the second subframe includes at least one of a subframe on the second time resource or a subframe that is in a second serving cell and is corresponding to the last subframe on the second time resource.

With reference to any one of the third aspect, or the first to the second possible implementation manners of the third aspect, in a fifth possible implementation manner of the third aspect, the duration information is carried in the last subframe on the second time resource.

With reference to any one of the third aspect, or the first to the fifth possible implementation manners of the third aspect, in a sixth possible implementation manner of the third aspect, the duration information is carried on a physical layer common control channel.

According to a fourth aspect, an embodiment of the present disclosure provides a second device, including:

a management unit, configured to determine an ending moment of a second time resource; and a sending unit, configured to send duration information to a first device, where the duration information is used to indicate a time length from a starting moment of the duration information to the ending moment of the second time resource.

With reference to the fourth aspect, in a first possible implementation manner of the fourth aspect, the second time resource is included in an open period of the first serving cell, and the open period of the first serving cell is a time period in which the first serving cell occupies an unlicensed spectrum.

With reference to the fourth aspect or the first possible implementation manner of the fourth aspect, in a second possible implementation manner of the fourth aspect, the duration information includes information about a first length, and the first length is a length of the last subframe on the second time resource.

With reference to any one of the fourth aspect, or the first to the second possible implementation manners of the fourth aspect, in a third possible implementation manner of the fourth aspect, the sending unit is further configured to send at least two pieces of duration information of the first serving cell to the first device.

With reference to any one of the fourth aspect, or the first to the second possible implementation manners of the fourth aspect, in a fourth possible implementation manner of the fourth aspect, the duration information is carried on a control channel in a second subframe, and the second subframe includes at least one of a subframe on the second time resource or a subframe that is in a second serving cell and is corresponding to the last subframe on the second time resource.

With reference to any one of the fourth aspect, or the first to the second possible implementation manners of the fourth aspect, in a fifth possible implementation manner of the fourth aspect, the duration information is carried in the last subframe on the second time resource.

With reference to any one of the fourth aspect, or the first to the fifth possible implementation manners of the fourth aspect, in a sixth possible implementation manner of the fourth aspect, the duration information is carried on a physical layer common control channel.

According to a fifth aspect, an embodiment of the present disclosure provides a data transmission method, including:

detecting, by a first device, first information of a first serving cell in a preset time period of a first subframe on a first time resource or a first time set of a subframe on the first time resource, where the first time set is a set of predefined starting positions of the first information in a subframe, and the first time set includes at least two elements;

determining, by the first device, a starting position of a second time resource according to the first information; and detecting, by the first device, second information of the first serving cell in a second time set of a subframe on the second time resource, where the second time set is a set of predefined starting positions of the second information in a subframe, and the first time set and the second time set include at least one different element.

With reference to the fifth aspect, in a first possible implementation manner of the fifth aspect, the first time resource includes a close period of the first serving cell, and the close period of the first serving cell is a time period in which the first serving cell does not preempt an unlicensed spectrum; and the second time resource is included in an open period of the first serving cell, and the open period of the first serving cell is a time period in which the first serving cell occupies an unlicensed spectrum.

With reference to the fifth aspect or the first possible implementation manner of the fifth aspect, in a second possible implementation manner of the fifth aspect, the detecting, by a first device, first information of a first serving cell in a preset time period of a first subframe on a first time resource or a first time set of a subframe on the first time resource includes:

detecting, by the first device, third information, and determining a starting position of the first information according to the detected third information, where the third information is received after the first information; and detecting, by the first device, the received first information according to the starting position of the first information in the preset time period of the first subframe on the first time resource or the first time set of the subframe on the first time resource.

With reference to any one of the fifth aspect, or the first to the second possible implementation manners of the fifth aspect, in a third possible implementation manner of the fifth aspect, the first subframe in each frame period is the first subframe, the preset time period includes at least one orthogonal frequency division multiplexing OFDM symbol in the first subframe, and a frame period includes at least two subframes.

With reference to the third possible implementation manner of the fifth aspect, in a fourth possible implementation manner of the fifth aspect, the frame period is a fixed frame period FFP in a frame based equipment FBE frame structure; and the first subframe meets a formula: I mod F=offset, where I is a subframe index of the first subframe, F is a length of the fixed frame period FFP, and offset is an offset.

With reference to any one of the fifth aspect, or the first to the second possible implementation manners of the fifth aspect, in a fifth possible implementation manner of the fifth aspect, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

With reference to any one of the fifth aspect, or the first to the fifth possible implementation manners of the fifth aspect, in a sixth possible implementation manner of the fifth aspect, the first time set includes a starting moment of at least one orthogonal frequency division multiplexing OFDM symbol in a subframe; or the first time set includes a starting moment of at least 1/T OFDM symbols in a subframe, and T is an integer greater than 0.

With reference to any one of the fifth aspect, or the first to the sixth possible implementation manners of the fifth aspect, in a seventh possible implementation manner of the fifth aspect, the first time set includes a starting position of the $(k+x)^{th}$ OFDM symbol in a subframe, where a value of k includes at least one of 3, 4, 5, 6, 8, 9, or 12, x represents a quantity of OFDM symbols occupied by a preamble sequence, a value of x is 0, 1, 2, 3, or 4, and 1≤k+x≤14.

With reference to any one of the fifth aspect, or the first to the seventh possible implementation manners of the fifth aspect, in an eighth possible implementation manner of the fifth aspect, the starting position of the second time resource is a starting moment of the $n^{th}$ data transmission unit following the starting position of the first information, n is a positive integer, the data transmission unit is 1/T OFDM symbols, and T is an integer greater than 0.

With reference to any one of the fifth aspect, or the first to the eighth possible implementation manners of the fifth aspect, in a ninth possible implementation manner of the fifth aspect, the method further includes:

detecting, by the first device, duration information; and determining, by the first device, an ending moment of the second time resource according to the duration information.

With reference to the ninth possible implementation manner of the fifth aspect, in a tenth possible implementation manner of the fifth aspect, the duration information includes information about a first length, and the first length is a length of the last subframe on the second time resource.

With reference to the ninth possible implementation manner of the fifth aspect or the tenth possible implementation manner of the fifth aspect, in an eleventh possible implementation manner of the fifth aspect, the method further includes:

detecting, by the first device, at least two pieces of duration information of the first serving cell; and the determining, by the first device, an ending moment of the second time resource according to the duration information includes:

determining, by the first device, the ending moment of the second time resource according to the last piece of detected duration information.

With reference to the ninth possible implementation manner of the fifth aspect or the tenth possible implementation manner of the fifth aspect, in a twelfth possible implementation manner of the fifth aspect, the duration information is carried on a control channel in a second subframe, and the second subframe includes at least one of a subframe on the second time resource or a subframe that is in a second serving cell and is corresponding to the last subframe on the second time resource.

With reference to the ninth possible implementation manner of the fifth aspect or the tenth possible implementation manner of the fifth aspect, in a thirteenth possible implementation manner of the fifth aspect, the duration information is carried in the last subframe on the second time resource.

With reference to any implementation manner of the ninth possible implementation manner of the fifth aspect to the thirteenth possible implementation manner of the fifth aspect, in a fourteenth possible implementation manner of the fifth aspect, the duration information is carried on a physical layer common control channel.

According to a sixth aspect, an embodiment of the present disclosure provides a data transmission method, including:

determining, by a second device in a preset time period of a first subframe on a first time resource or a first time set of a subframe on the first time resource, a starting position of sending first information of a first serving cell, and sending the first information to a first device, where the first time set is a set of predefined starting positions of the first information in a subframe, and the first time set includes at least two elements;

determining, by the second device, a starting position of the second time resource according to the first information; and determining, by the second device in a second time set of a subframe on the second time resource, a starting position of sending second information of the first serving cell, and sending the second information to the first device, where the second time set is a set of predefined starting positions of the second information in a subframe, and the first time set and the second time set include at least one different element.

With reference to the sixth aspect, in a first possible implementation manner of the sixth aspect, the first time resource includes a close period of the first serving cell, and the close period of the first serving cell is a time period in which the first serving cell does not preempt an unlicensed spectrum; and the second time resource is included in an open period of the first serving cell, and the open period of the first serving cell is a time period in which the first serving cell occupies an unlicensed spectrum.

With reference to the sixth aspect or the first possible implementation manner of the sixth aspect, in a second possible implementation manner of the sixth aspect, after the sending, by the second device, the first information of the first serving cell to a first device, the method further includes:

sending, by the second device, third information to the first device, where the third information is used to indicate the starting position of the first information.

With reference to any one of the sixth aspect, or the first to the second possible implementation manners of the sixth aspect, in a third possible implementation manner of the sixth aspect, the first subframe in each frame period is the first subframe, the preset time period includes at least one orthogonal frequency division multiplexing OFDM symbol in the first subframe, and a frame period includes at least two subframes.

With reference to the third possible implementation manner of the sixth aspect, in a fourth possible implementation manner of the sixth aspect, the frame period is a fixed frame period FFP in a frame based equipment FBE frame structure; and the first subframe meets a formula: I mod F=offset, where I is a subframe index of the first subframe, F is a length of the fixed frame period FFP, and offset is an offset.

With reference to any one of the sixth aspect, or the first to the second possible implementation manners of the sixth aspect, in a fifth possible implementation manner of the sixth aspect, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

With reference to any one of the sixth aspect, or the first to the fifth possible implementation manners of the sixth aspect, in a sixth possible implementation manner of the sixth aspect, the first time set includes a starting moment of at least one orthogonal frequency division multiplexing OFDM symbol in a subframe; or the first time set includes a starting moment of at least 1/T OFDM symbols in a subframe, and T is an integer greater than 0.

With reference to any one of the sixth aspect, or the first to the sixth possible implementation manners of the sixth aspect, in a seventh possible implementation manner of the sixth aspect, the first time set includes a starting position of the $(k+x)^{th}$ OFDM symbol in a subframe, where a value of k includes at least one of 3, 4, 5, 6, 8, 9, or 12, x represents a quantity of OFDM symbols occupied by a preamble sequence, a value of x is 0, 1, 2, 3, or 4, and 1≤k+x≤14.

With reference to any one of the sixth aspect, or the first to the seventh possible implementation manners of the sixth aspect, in an eighth possible implementation manner of the sixth aspect, the starting position of the second time resource is a starting moment of the $n^{th}$ data transmission unit following the starting position of the first information, n is a positive integer, the data transmission unit is 1/T OFDM symbols, and T is an integer greater than 0.

With reference to any one of the sixth aspect, or the first to the eighth possible implementation manners of the sixth aspect, in a ninth possible implementation manner of the sixth aspect, the method further includes:

determining, by the second device, an ending moment of the second time resource; and sending, by the second device, duration information to the first device, where the duration information is used to indicate a time length from a starting moment of the duration information to the ending moment of the second time resource.

With reference to the ninth possible implementation manner of the sixth aspect, in a tenth possible implementation manner of the sixth aspect, the duration information includes information about a first length, and the first length is a length of the last subframe on the second time resource.

With reference to the ninth possible implementation manner of the sixth aspect or the tenth possible implementation manner of the sixth aspect, in an eleventh possible implementation manner of the sixth aspect, the sending, by the second device, duration information of the first serving cell to the first device includes:

sending, by the second device, at least two pieces of duration information of the first serving cell to the first device.

With reference to the ninth possible implementation manner of the sixth aspect or the tenth possible implementation manner of the sixth aspect, in a twelfth possible implementation manner of the sixth aspect, the duration information is carried on a control channel in a second subframe, and the second subframe includes at least one of a subframe on the second time resource or a subframe that is in a second serving cell and is corresponding to the last subframe on the second time resource.

With reference to the ninth possible implementation manner of the sixth aspect or the tenth possible implementation manner of the sixth aspect, in a thirteenth possible implementation manner of the sixth aspect, the duration information is carried in the last subframe on the second time resource.

With reference to any implementation manner of the ninth possible implementation manner of the sixth aspect to the thirteenth possible implementation manner of the sixth aspect, in a fourteenth possible implementation manner of the sixth aspect, the duration information is carried on a physical layer common control channel.

According to a seventh aspect, an embodiment of the present disclosure provides a data transmission method, including:

detecting, by a first device, duration information; and determining, by the first device, an ending moment of the second time resource according to the duration information.

With reference to the seventh aspect, in a first possible implementation manner of the seventh aspect, the second time resource is included in an open period of the first serving cell, and the open period of the first serving cell is a time period in which the first serving cell occupies an unlicensed spectrum.

With reference to the seventh aspect or the first possible implementation manner of the seventh aspect, in a second possible implementation manner of the seventh aspect, the duration information includes information about a first length, and the first length is a length of the last subframe on the second time resource.

With reference to any one of the seventh aspect, or the first to the second possible implementation manners of the seventh aspect, in a third possible implementation manner of the seventh aspect, the method further includes:

detecting, by the first device, at least two pieces of duration information of the first serving cell; and the determining, by the first device, an ending moment of the second time resource according to the duration information includes:

determining, by the first device, the ending moment of the second time resource according to the last piece of detected duration information.

With reference to any one of the seventh aspect, or the first to the second possible implementation manners of the seventh aspect, in a fourth possible implementation manner of the seventh aspect, the duration information is carried on a control channel in a second subframe, and the second subframe includes at least one of a subframe on the second time resource or a subframe that is in a second serving cell and is corresponding to the last subframe on the second time resource.

With reference to any one of the seventh aspect, or the first to the second possible implementation manners of the seventh aspect, in a fifth possible implementation manner of the seventh aspect, the duration information is carried in the last subframe on the second time resource.

With reference to any one of the seventh aspect, or the first to the fifth possible implementation manners of the seventh aspect, in a sixth possible implementation manner of the seventh aspect, the duration information is carried on a physical layer common control channel.

According to an eighth aspect, an embodiment of the present disclosure provides a data transmission method, including:

determining, by a second device, an ending moment of a second time resource; and sending, by the second device, duration information to a first device, where the duration information is used to indicate a time length from a starting moment of the duration information to the ending moment of the second time resource.

With reference to the eighth aspect, in a first possible implementation manner of the eighth aspect, the second time resource is included in an open period of the first serving cell, and the open period of the first serving cell is a time period in which the first serving cell occupies an unlicensed spectrum.

With reference to the eighth aspect or the first possible implementation manner of the eighth aspect, in a second possible implementation manner of the eighth aspect, the duration information includes information about a first length, and the first length is a length of the last subframe on the second time resource.

With reference to any one of the eighth aspect, or the first to the second possible implementation manners of the eighth aspect, in a third possible implementation manner of the eighth aspect, the sending, by the second device, duration information of the first serving cell to the first device includes:

sending, by the second device, at least two pieces of duration information of the first serving cell to the first device.

With reference to any one of the eighth aspect, or the first to the second possible implementation manners of the eighth aspect, in a fourth possible implementation manner of the eighth aspect, the duration information is carried on a control channel in a second subframe, and the second subframe includes at least one of a subframe on the second time resource or a subframe that is in a second serving cell and is corresponding to the last subframe on the second time resource.

With reference to any one of the eighth aspect, or the first to the second possible implementation manners of the eighth aspect, in a fifth possible implementation manner of the eighth aspect, the duration information is carried in the last subframe on the second time resource.

With reference to any one of the eighth aspect, or the first to the fifth possible implementation manners of the eighth aspect, in a sixth possible implementation manner of the eighth aspect, the duration information is carried on a physical layer common control channel.

According to a ninth aspect, an embodiment of the present disclosure provides a wireless communications system, including: a first device and a second device, where the first device is the first device in the first aspect or any possible implementation manner of the first aspect, and the second device is the second device in the second aspect or any possible implementation manner of the second aspect.

According to a tenth aspect, an embodiment of the present disclosure provides a wireless communications system, including: a first device and a second device, where the first device is the first device in the third aspect or any possible implementation manner of the third aspect, and the second device is the second device in the fourth aspect or any possible implementation manner of the fourth aspect.

According to the data transmission method, the device, and the system provided in the embodiments of the present disclosure, a first device detects first information of a first serving cell in a preset time period of a first subframe on a first time resource or a first time set of a subframe on the first time resource, determines a starting position of a second time resource according to the first information, and detects second information of the first serving cell in a second time set of a subframe on the second time resource. This resolves a prior-art problem that a receive end cannot correctly receive data because a starting moment of sending information on a license-exempt spectrum cannot be determined.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
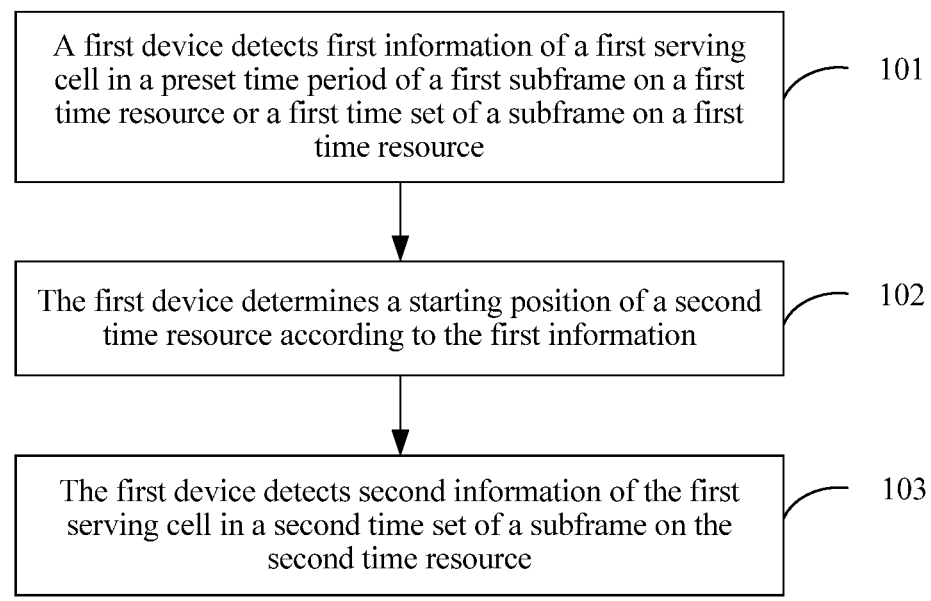
FIG. 1 is a schematic flowchart of a data transmission method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the embodiments of the present disclosure may be applied to various communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), or a Worldwide Interoperability for Microwave Access (WiMAX) communications system. Particularly, the technical solutions are used in a licensed spectrum resource-assisted access LTE system, that is, a licensed-assisted access LTE (Licensed-Assisted Access, LTE) system. The LAA-LTE system refers to an LTE system in which a licensed spectrum resource and a license-exempt spectrum resource are used together in a carrier aggregation (CA) manner or a non-CA manner.

For example, in a main application scenario, a licensed spectrum resource and a license-exempt spectrum resource are used in a CA manner, that is, the licensed spectrum resource or a carrier included in the licensed spectrum resource or a cell operating on the licensed spectrum resource is used as a primary serving cell, and the license-exempt spectrum resource or a carrier included in the license-exempt spectrum resource or a cell operating on the license-exempt spectrum resource is used as a secondary serving cell. In addition, the primary serving cell and the secondary serving cell are deployed on a same base station, or deployed on different base stations. There is an ideal backhaul path between the primary serving cell and the secondary serving cell.

The embodiments of the present disclosure are not limited to be used in a CA manner scenario, and may be used in another scenario. For example, for a serving cell independently deployed on a license-exempt spectrum resource, the serving cell has a function of providing independent access, and in this case, assist by a serving cell operating on a licensed spectrum resource is not needed. For another example, in a scenario in which there is no ideal backhaul path between two serving cells (for example, a primary serving cell and a secondary serving cell), because a backhaul delay is relatively long, information cannot be rapidly coordinated between the two serving cells.

In the embodiments of the present disclosure, both a licensed spectrum resource and a license-exempt spectrum resource may include one or more carriers, and when carrier aggregation is performed on the licensed spectrum resource and the license-exempt spectrum resource, carrier aggregation is performed on the one or more carriers included in the licensed spectrum resource and the one or more carriers included in the license-exempt spectrum resource.

It should be understood that in the embodiments of the present disclosure, a first device or a second device includes but is not limited to user equipment (UE), a mobile station (MS), a mobile terminal, a mobile telephone, a handset, portable equipment, and the like. The user equipment may communicate with one or more core networks by using a radio access network (RAN). For example, the user equipment may be a mobile telephone (or referred to as a "cellular" phone), or a computer with a wireless communication function, or the user equipment may be a portable, pocket-sized, handheld, computer built-in, or in-vehicle mobile apparatus. It should be noted that the user equipment may be a relay device, and no limitation is imposed in the present disclosure.

In the embodiments of the present disclosure, the first device may be user equipment, and the second device may be a base transceiver station (BTS) in GSM or CDMA, may be a NodeB in WCDMA, or may be an evolved NodeB (eNB or e-NodeB) in LTE, which is not limited in the embodiments of the present disclosure.

A cell recorded in the embodiments of the present disclosure may be a cell corresponding to a base station. The cell may belong to a macro base station, or may belong to a micro base station, such as a base station corresponding to a small cell. The small cell herein may further include a metro cell, a micro cell, a pico cell, a femto cell, and the like. These small cells feature small coverage and low transmit power, and are applicable to providing a high-rate data transmission service.

In the embodiments of the present disclosure, concepts of a carrier and a cell are equivalent in the LTE system. For example, access of UE to a carrier is equivalent to access of UE to a cell, and the cell concept is used in the present disclosure for description.

It should be understood that in the embodiments of the present disclosure, "first" and "second" are merely used for distinguishing, and are not construed as a limitation in the embodiments of the present disclosure.

An embodiment of the present disclosure provides a data transmission method. Referring to FIG. 1, the data transmission method includes the following steps.

101. A first device detects first information of a first serving cell in a preset time period of a first subframe on a first time resource or a first time set of a subframe on a first time resource.

The first time set is a set of predefined starting positions of the first information in a subframe, the first time set includes at least two elements, and the first information is used to indicate a starting position of a second time resource. Herein, it should be noted that the predefined starting position of the first information in the subframe is a possible starting position of the first information in the subframe, but it does not mean that there is a predefining operation. In addition, that a first device detects first information of a first serving cell in a preset time period of a first subframe on a first time resource or a first time set of a subframe on a first time resource does not mean that the first device detects the first information in the entire preset time period of the first subframe or the entire first time set, but only means that a starting position of the first information is located in the preset time period of the first subframe or the first time set of the subframe.

Optionally, the first time resource includes a close period of the first serving cell, and the close period of the first serving cell is a time period in which the first serving cell does not preempt an unlicensed spectrum. The second time resource is included in an open period of the first serving cell, and the open period of the first serving cell is a time period in which the first serving cell occupies an unlicensed spectrum. Preferably, the data transmission method provided in this embodiment may be used to determine a moment of switching the first serving cell from the close period to the open period.

Preferably, the first serving cell is a cell on a license-exempt spectrum. The first information may be carried on a reference signal, a PDSCH (physical downlink shared channel), a PDCCH (physical downlink control channel), or an EPDCCH (enhanced physical downlink control channel). Further, optionally, the reference signal includes but is not limited to: a primary synchronization signal (PSS), a secondary synchronization signal (SSS), a cell-specific reference signal (CRS), a UE-specific reference signal used for data demodulation of an enhanced physical downlink shared channel (EPDSCH), a demodulation reference signal (DM-RS) used for EPDCCH demodulation, a positioning reference signal (PRS), a channel state information reference signal (CSI-RS), and a discovery reference signal (DRS).

In a manner in which the first device detects the first information of the first serving cell, and the first information is used to indicate the starting position of the second time resource, the first device detects existence of the first information of the first serving cell to determine whether the first serving cell or a base station to which the first serving cell belongs preempts an unlicensed spectrum. If the first information is detected, it indicates that the first serving cell or the base station to which the first serving cell belongs preempts an unlicensed spectrum. In this case, the first serving cell may determine the starting position of the second time resource, and the second time resource is included in the time period in which the first serving cell occupies an unlicensed spectrum. In this case, if the first information is carried on a reference signal, the reference signal may include the first information. For example, if the first information is represented by a reference signal that carries a cell identity of the first serving cell, the first device may detect existence of the reference signal to determine whether the first information exists. If the reference signal is detected, it may indicate that the first device preempts a license-exempt spectrum resource. Further, the first device may determine the starting position of the second time resource. In another aspect, if the first information is carried on a control channel, such as a PDCCH or an EPDCCH, downlink control information (DCI) carried on the control channel may include the first information. The first device detects existence of the DCI to determine whether the first serving cell preempts an unlicensed spectrum. Further, the control channel that carries the first information may carry the first information but does not carry other information, and a frequency resource position of a frequency resource to which the first information or the control channel that carries the first information is mapped is predefined. For example, the control channel that carries the first information occupies only one OFDM (orthogonal frequency division multiplexing) symbol in time, and may be mapped onto a fixed resource element (RE) on the frequency resource, so as to simplify complexity of detection by the first device.

In another manner in which the first device detects the first information of the first serving cell, and the first information is used to indicate the starting position of the second time resource, the first information carries an identifier of the starting position of the second time resource. The first device detects the first information of the first serving cell, and determines content indicated by the first information, to directly determine the starting position of the second time resource, and the second time resource is included in the time period in which the first serving cell occupies an unlicensed spectrum. In this case, if the first information is carried on a reference signal, different starting positions of the second time resource may be indicated by forming different reference signals. The different reference signals may include at least one of the following: different sequences that form the reference signals, different frequency resources occupied by the reference signals in frequency, or different time resources of the reference signals in time. In an example in which the reference signal is a PSS, a sequence that forms the PSS may take four different forms, and therefore, four different starting positions of the second time resource may be represented. If the first information is carried on a control channel, for example, the first information is DCI carried on the control channel, different content indicated by the DCI may be used to determine different starting positions of the second time resource.

Specifically, optionally, in a first application scenario, in an example of LBE (load based equipment), the first device detects the first information of the first serving cell in the first time set of the subframe on the first time resource. Certainly, the description herein is merely exemplary, and the present disclosure is not limited thereto.

Optionally, the first time set includes a starting moment of at least one OFDM symbol in a subframe, or the first time set includes a starting moment of at least 1/T OFDM symbols in a subframe, and T is an integer greater than 0. It should be noted that in this embodiment of the present disclosure, when a predefined starting position of the first information in a subframe is described, a starting moment of an OFDM symbol may be in a one-to-one correspondence with an index of the OFDM symbol, and further, may be in a one-to-one correspondence with the OFDM symbol. For example, if an OFDM symbol uses a normal cyclic prefix, in a subframe, a starting moment of the first OFDM symbol may be understood as the first OFDM symbol or an OFDM symbol whose symbol index is 0, a starting moment of the second OFDM symbol may be understood as the second OFDM symbol or an OFDM symbol whose symbol index is 1, . . . , and a starting moment of the fourteenth OFDM symbol may be understood as the fourteenth OFDM symbol or an OFDM symbol whose symbol index is 13. When an OFDM symbol uses an extended cyclic prefix, description is similar, and details are not described herein. Likewise, a starting moment of 1/T OFDM symbols may be in a one-to-one correspondence with the 1/T OFDM symbols, or in a one-to-one correspondence with an index of the 1/T OFDM symbols.

Preferably, the first time set includes a starting position of the $(k+x)^{th}$ OFDM symbol in a subframe, where a value of k includes at least one of 3, 4, 5, 6, 8, 9, or 12, x represents a quantity of OFDM symbols occupied by a preamble sequence, a value of x is 0, 1, 2, 3, or 4, and $1 \le k+x \le 14$.

Figure 2:
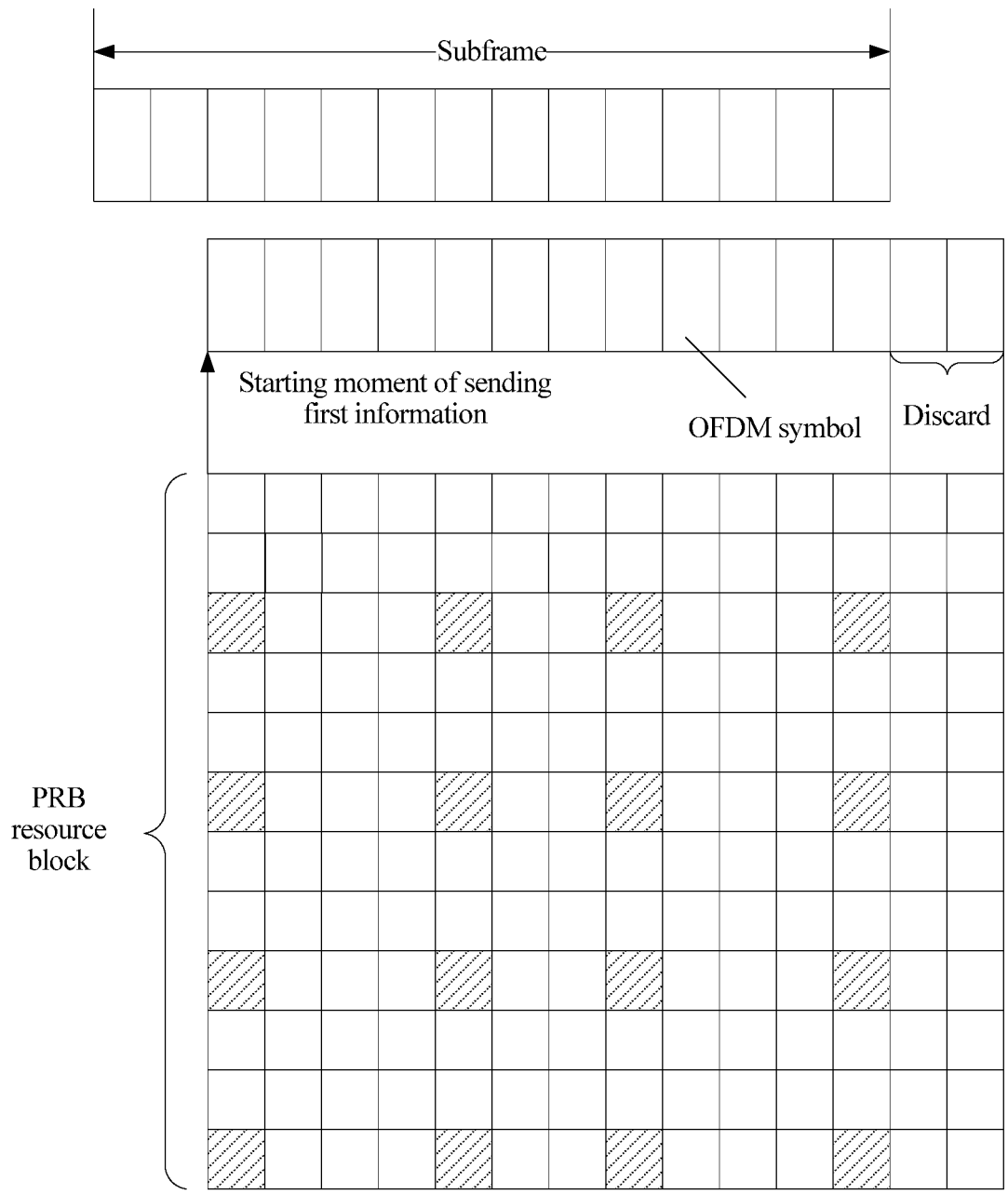
FIG. 2 is a schematic diagram of resource mapping of sent first information according to an embodiment of the present disclosure.

For example, in a time division duplex (TDD) system in an LTE system, a downlink pilot timeslot (DwPTS) may support data transmission of an incomplete subframe. If an OFDM symbol uses a normal cyclic prefix (NCP), a quantity of OFDM symbols included in the DwPTS may be 3, 6, 9, 10, 11, or 12. In a subframe that includes the first information, because some OFDM symbols of the subframe are transmitted, a corresponding value of k may be 12, 9, 6, 5, 4, or 3 in this case. As shown in FIG. 2, when the quantity of OFDM symbols included in the DwPTS is 12, the value of k may be 3. If an OFDM symbol uses an extended cyclic prefix (ECP), a quantity of OFDM symbols included in the DwPTS may be 3, 5, 8, 9, or 10, and a corresponding value of k may be 10, 8, 5, 4, or 3 in this case. In this way, a structure of the DwPTS in the existing TDD system is used, implementing rate matching, and reducing complexity of processing at a UE end and complexity of processing by an eNB.

Figure 3:
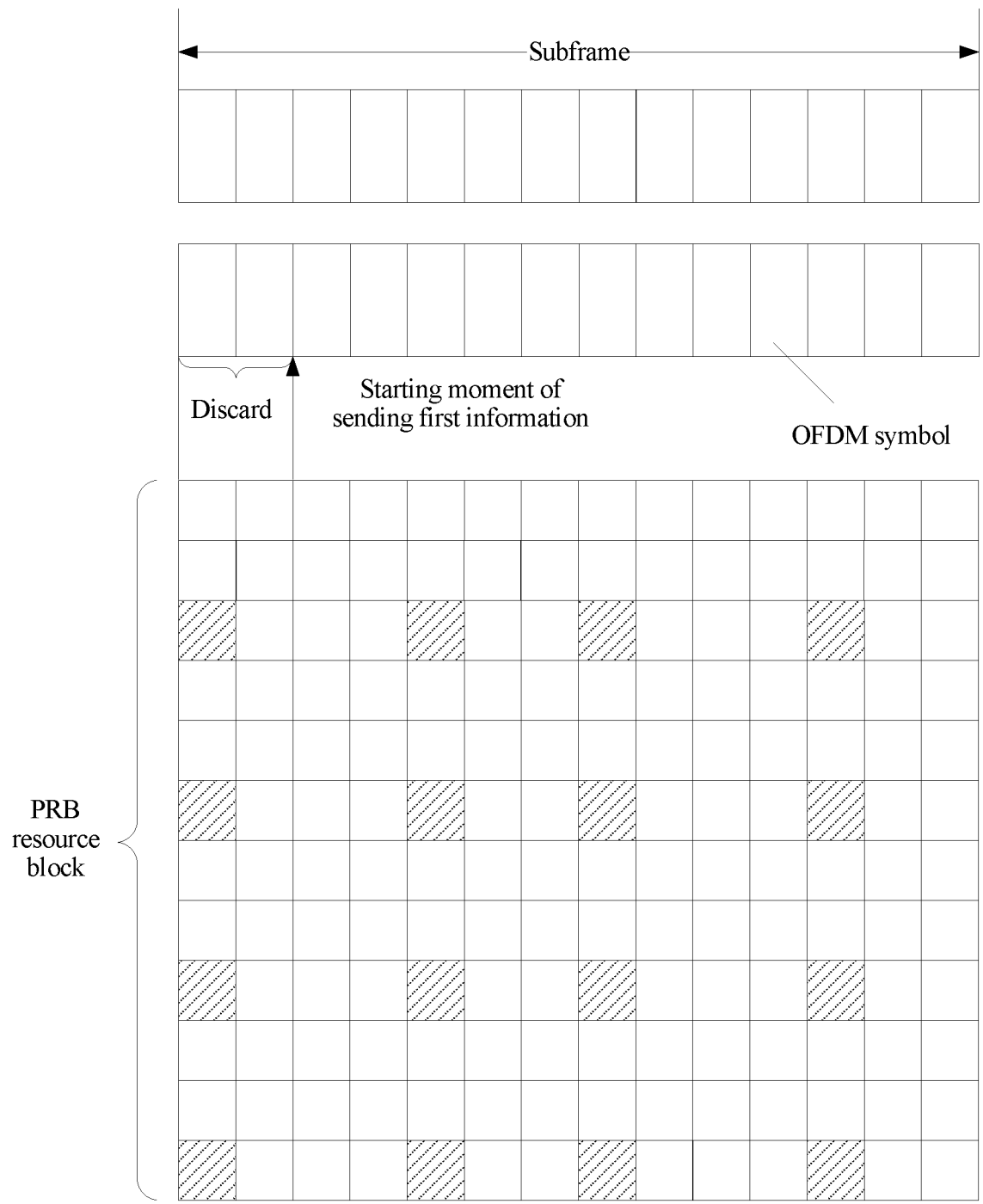
FIG. 3 is another schematic diagram of resource mapping of sent first information according to an embodiment of the present disclosure.

Herein, it should be noted that an OFDM symbol included in a DwPTS may be mapped onto a PRB (physical resource block) in two manners shown in FIG. 2 or FIG. 3. In FIG. 2, a quantity of OFDM symbols included in the DwPTS is 12, the starting position of the first information is used as a starting boundary of the DwPTS, and the last two OFDM symbols are discarded. Alternatively, according to an example shown in FIG. 3, a starting moment of the third OFDM symbol may be used as a starting moment of sending the first information, and the first two OFDM symbols are discarded. The present disclosure sets no limitation on how to map an OFDM symbol.

In addition, preamble signals or initial signals corresponding to x OFDM symbols (in this embodiment of the present disclosure, a reference signal may be understood as a preamble signal or an initial signal) may be included in the first information. Functions of the preamble signal or the initial signal may include: implementing coarse synchronization between the first serving cell and UE, implementing fine synchronization between the first serving cell and UE, carrying operator information of the base station to which the first serving cell belongs, carrying cell identification information of the first serving cell, automatic gain control (AGC), determining, by detecting a preamble sequence, that the first serving cell preempts a license-exempt spectrum resource, implementing channel state information (CSI) measurement by using a preamble signal, and the like. A sequence form of the preamble sequence may include but be not limited to the following sequence forms: a constant amplitude zero auto-correlation (CAZAC) sequence, a binary sequence, an m-sequence, a pseudo random sequence, a sequence that forms a reference signal in the LTE system, or a ZC (Zadoff-Chu) sequence. Alternatively, a preamble sequence may be directly obtained from a reference signal in the existing LTE system or may be obtained by properly changing a reference signal in the existing LTE system. The reference signal in the existing LIE system is shown in the foregoing, and details are not described herein. For example, because use of a license-exempt spectrum resource is restricted by bandwidth, and sending needs to be performed continuously in time, reference signal mapping in the existing LTE system may be properly changed. It should be noted that in this embodiment of the present disclosure, a position of sending the first information may be a boundary of a fractional quantity of OFDM symbols. When the position of sending the first information is the boundary of the fractional quantity of OFDM symbols, UE may detect or not detect the first information carried on the fractional quantity of OFDM symbols. Therefore, from a perspective of the UE, a preset position of the first information in a subframe may still start from a boundary of an OFDM symbol.

Alternatively, optionally, in a second application scenario, in an example of FBE (frame based equipment), the first device detects the first information of the first serving cell in the preset time period of the first subframe on the first time resource. Certainly, the description herein is merely exemplary, and the present disclosure is not limited thereto.

Specifically, optionally, the first subframe is the first subframe in each frame period, the preset time period includes at least one OFDM symbol in the first subframe, and a frame period includes at least two subframes. The following lists two specific frame structures for description. Certainly, the description herein is merely exemplary, and the present disclosure is not limited thereto.

Figures 4, 5:
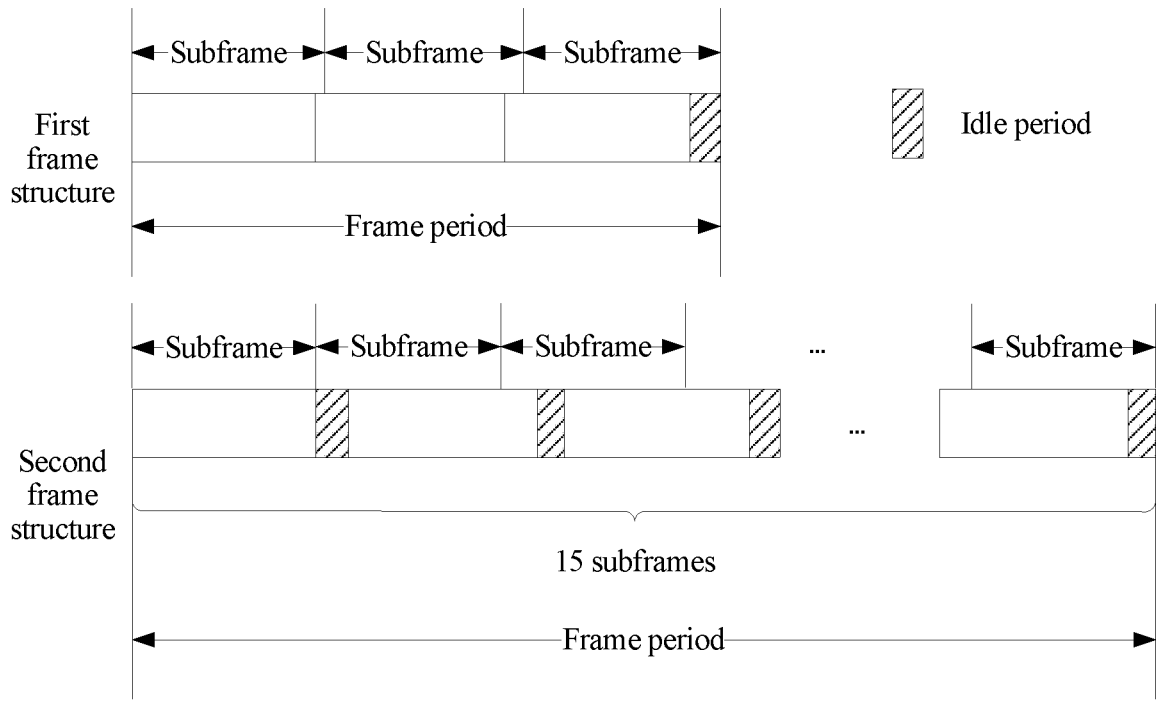
FIG. 4 is a schematic diagram of a frame structure of first information according to an embodiment of the present disclosure.
FIG. 5 is a schematic flowchart of a data transmission method according to another embodiment of the present disclosure.

Referring to FIG. 4, in a first frame structure, a frame period is an FFP (fixed frame period) in an FBE frame structure. The first subframe meets a formula: I mod F=offset, where I is a subframe index of the first subframe, F is a length of the fixed frame period FFP, and offset is an offset. The subframe index I may be determined by using a radio frame index and a timeslot index, and the subframe index I may be determined according to a formula: I=10*$n_f$+$n_s$, where $n_f$ represents the radio frame index, and a value of $n_f$ is any integer from 0 to 1023 in the LTE system; and $n_s$ represents a timeslot index, and a value of $n_s$ is any integer from 0 to 19 in the LTE system. The length F of the FFP and the offset may be preconfigured, may be stipulated by a standard, or may be announced to the first device by using signaling. The signaling may be physical layer signaling, radio resource control (RRC) signaling, or the like. For example, if F=10 and offset=5, a subframe whose subframe index is #5, #15, . . . may be determined as the first subframe by using the formula.

In the first frame structure in FIG. 4, for example, a frame period includes three subframes, and an idle period is located in the last subframe of the three subframes. The first device may detect the first information in a preset time period of the first subframe in each frame period, and a subframe whose subframe index meets the formula is a first subframe, so that first subframes can be determined by using the formula. For the first frame structure, the preset time period of the first subframe may be a boundary of an OFDM symbol included in the first subframe or may be understood as an OFDM symbol. For example, the first information may be included in downlink control information (DCI), and is carried by using a PDCCH or an EPDCCH. When the first information is carried by using a PDCCH, the preset time period of the first subframe may include any moment, in the first subframe, from a starting time position of sending the PDCCH that carries the first information to an ending time position of sending the PDCCH. For example, if the PDCCH that carries the first information occupies only one OFDM symbol, and the occupied OFDM symbol is the first OFDM symbol in the first subframe, the preset time period of the first subframe includes the first OFDM symbol in the first subframe. If the PDCCH that carries the first information occupies M OFDM symbols, the preset time period of the first subframe includes any one or more OFDM symbols of the first OFDM symbol to the M$^{th}$ OFDM symbol in the first subframe, or the preset time period of the first subframe may be the first OFDM symbol in the first subframe (in this case, the first device starts to detect existence of the first information or detect content of the first information from the first OFDM symbol in the first subframe).

In a second frame structure, all subframes in each frame period are the first subframe, idle periods included in each frame period are distributed in each frame period at an even interval, and an index m of a starting OFDM symbol in the preset time period meets a formula: I mod X=offset+m, where I is a subframe index of the first subframe, X is a length of a frame period, and offset is an offset. The subframe index is shown in the foregoing, and details are not described herein. X and offset in the foregoing formula may be preconfigured, may be stipulated by a standard, or may be announced to UE by using signaling. The signaling may be physical layer signaling, or RRC signaling. As shown in FIG. 4, in the second frame structure, a time resource of a subframe length and an idle period are used as a small period, and one idle period may occupy one OFDM symbol. In FIG. 4, for example, a frame period includes 15 subframes, and a length of each small period is a sum of a subframe length (1 ms) and a length of an idle period. An OFDM symbol, in each subframe, on which the starting position of the first information is located may be determined by calculating m by using the formula, that is, an OFDM symbol, in each subframe, from which the first device starts to detect the first information may be determined. It should be noted that in this embodiment of the present disclosure, the predefined starting position of the first information may include a potential starting position or a possible starting position of the first information. For example, for the second frame structure, assuming that X=15 and offset=0, according to the foregoing formula, a subframe whose subframe index is #0 is corresponding to a complete subframe, and UE may start to detect the first information from a starting position of the subframe, that is, an OFDM symbol whose symbol index is 0. A detection position corresponding to a subframe #1 starts from an OFDM symbol that is included in the subframe #1 and whose symbol index is #1; . . . ; and for a subframe #14, m=14 is obtained by means of calculation according to the foregoing formula. However, for a subframe using a normal cyclic prefix, a maximum of 14 OFDM symbols are included in a subframe, and there is no OFDM symbol whose symbol index is 14. Therefore, for the subframe #14, it indicates that there is no need to detect the first information in this subframe.

For example, when the length of the idle period is two OFDM symbols, X in the foregoing formula is equal to 8 (14/2+1), a value of the symbol index m is 0, 2, 4, . . . , or 14, and a first subframe that meets m=14 and whose subframe index is I does not include a preset time period, that is, there is no need to detect the first information in the first subframe.

Generally, for the second frame structure, the index m of the starting OFDM symbol in the preset time period meets the formula: I mod X=offset+m, where I is the subframe index of the first subframe, X is a length of a subframe period, X=14/k+1, m=k*j, j is an integer from 0 to X−1, and k is a quantity of OFDM symbols occupied by an idle period. Preferably, a value of k is 1 or 2, and offset is an offset. If a subframe uses a cyclic prefix, the foregoing formula may be X=12/k+1. In the formula, it should be noted that values of X, offset, and k may be determined by means of preconfiguration, standard stipulation, physical layer signaling, or RRC signaling. If m determined by using the foregoing formula is greater than a maximum index of an OFDM symbol included in one complete subframe (1 millisecond) (for example, if the subframe uses a normal cyclic prefix, the maximum index is 13, or if the subframe uses an extended cyclic prefix, the maximum index is 12), there is no need to detect the first information in the corresponding first subframe. In this embodiment of the present disclosure, mod represents a modulo operation.

For different carriers, different sensing mechanisms may be used, or for different time periods of a same carrier, different sensing mechanisms may be used. The different time periods may be all located in a close period of the same carrier (which is corresponding to a case in which a serving cell that may perform an operation on the carrier does not preempt resources of the carrier), or may be all located in an open period of the same carrier (which is corresponding to a case in which a serving cell that may perform an operation on the carrier preempts resources of the carrier). A sensing mechanism of the first serving cell may include at least one of a sensing mechanism of frame based equipment (FBE) or a sensing mechanism of load based equipment (LBE). When there are multiple serving cells, the sensing mechanism of the first serving cell may be different from that of another cell, or when the first serving cell includes multiple carriers, different sensing mechanisms may be used for the carriers. In this way, if a base station uses LBE on all carriers available to the first device, complexity of detection by the first device is in direct proportion to a quantity of all carriers available to the first device. In another aspect, if the base station uses FBE on all the carriers available to the first device to preempt license-exempt spectrum resources, a capability of competing, by the base station, for the license-exempt spectrum resources on all the carriers available to the first device is relatively poor, especially when there are a large quantity of other RAT (radio access technology) devices, such as WiFi (Wireless Fidelity) devices, operating on the carriers. Therefore, the first device may detect a quantity of other RAT devices (for example, WiFi devices) operating on each carrier, or a load level of each carrier to determine that different sensing mechanisms are used for different carriers. For example, for a carrier with heavy service load or a carrier on which a large quantity of other RAT devices (for example, WiFi) operate, the base station may use LBE on the carrier to increase a preemption chance; for a carrier with light service load or a carrier on which a small quantity of other RAT devices (for example, WiFi) operate, the base station may use FBE on the carrier to reduce complexity of detection by UE. Herein, a quantity of all carriers available to the UE may be greater than a quantity of carriers that can be simultaneously scheduled by the UE.

In addition, optionally, regardless of the first application scenario such as an LBE scenario, or the second application scenario such as an FBE scenario, the first device may detect the first information by first caching and then detection.

Specifically, the first device may detect third information, where the third information is used to indicate the starting position of the first information. The first device determines the starting position of the first information according to the detected third information, and the third information is received after the first information. The first device detects the received first information according to the starting position of the first information in the preset time period of the first subframe on the first time resource or the first time set of the subframe on the first time resource.

That is, the first device first buffers the first information after receiving the first information, and then after receiving the third information, detects the first information according to the starting position information, of the first information, indicated by the third information. Because the third information indicates the starting position of the first information, blind detection by the first device is avoided, and power consumption of the first device is reduced.

Optionally, the third information may be carried in the first serving cell or a second serving cell, and a frequency of the second serving cell is different from that of the first serving cell. Preferably, the second serving cell is a cell on a licensed spectrum.

The third information may be carried on a PDCCH or an EPDCCH. It may be understood that, that the third information indicates the starting position of the first information may include: if the first device detects the third information, it indicates that the first information of the first serving cell exists, and it may indicate that the first serving cell preempts an unlicensed spectrum resource. In this case, the first information may be carried on the PDSCH. In this embodiment of the present disclosure, a time length of the PDSCH may be determined according to a length that is of a subframe and may be used for downlink data transmission, where the subframe includes the first information and is located in the open period of the first serving cell.

It may be understood that when the third information is used to indicate the starting position of the first information, the predefined starting position of the first information may be any OFDM symbol in a subframe, or may be one or more specified OFDM symbols in a subframe. In this case, a predefining operation may not be performed.

102. The first device determines a starting position of a second time resource according to the first information.

Optionally, the starting position of the second time resource may be the starting position of the first information, or the starting position of the second time resource may be a starting moment of the $n^{th}$ data transmission unit following the starting position of the first information, where n is a positive integer, the data transmission unit is 1/T OFDM symbols, and T is an integer greater than 0. Preferably, when the data transmission unit is a subframe, the starting position of the second time resource may be a starting moment of the first subframe following the starting position of the first information, or a starting position of the first information may be used as the starting position of the second time resource.

Optionally, with reference to step 101, in an example in which the second time resource is the open period of the first serving cell, if the first device detects the first information, it indicates that the first serving cell has preempted a license-exempt spectrum, and the first device may further determine the starting position of the second time resource according to the first information; or if the first device does not detect the first information, it indicates that the first serving cell has not preempted a license-exempt spectrum, and the first device needs to continue to perform detection. That is, the first device may detect existence of the first information to determine whether the first serving cell preempts a license-exempt spectrum resource.

103. The first device detects second information of the first serving cell in a second time set of a subframe on the second time resource.

The second time set is a set of predefined starting positions of the second information in a subframe, and the first time set and the second time set include at least one different element.

Optionally, the second information may be carried on a reference signal, a PDSCH, a PDCCH, or an EPDCCH. Preferably, the second information may be carried in control information on a control channel (for example, a PDCCH or an EPDCCH). Correspondingly, an element included in the second time set may be a possible starting position of the PDCCH or the EPDCCH in a subframe. For example, a starting position of the PDCCH may be the first OFDM symbol in the subframe, and a starting position of the EPDCCH may be the second, the third, or the fourth OFDM symbol in the subframe.

According to this embodiment of the present disclosure, specifically, in the close period of the first serving cell, the first device may detect the first information in a starting position of a specific subframe in the first serving cell or each OFDM symbol in each subframe, to determine whether the first serving cell may preempt a license-exempt spectrum. This can effectively determine a possible position in which the first serving cell randomly starts data transmission, and can effectively use an unlicensed spectrum resource. In another aspect, in the open period of the first serving cell, the first device may detect a control channel in only a boundary of each subframe or a boundary of an OFDM symbol in a specified subframe, to determine whether data is scheduled to the first device. This can reduce complexity of detection by UE. Further, in the close period of the first serving cell, the first device may perform measurement by using only a DRS. However, in the open period of the first serving cell, in addition to the DRS, the first device may perform measurement by using another reference signal such as a CRS or a CSI-RS, and the measurement includes RRM measurement, CSI measurement, and the like.

According to the data transmission method provided in this embodiment of the present disclosure, a first device detects first information of a first serving cell in a preset time period of a first subframe on a first time resource or a first time set of a subframe on a first time resource, determines a starting position of a second time resource according to the first information, and detects second information of the first serving cell in a second time set of a subframe on the second time resource. This resolves a prior-art problem that a receive end cannot correctly receive data because a starting moment of sending information on a license-exempt spectrum cannot be determined.

Based on the foregoing embodiment corresponding to FIG. 1, another embodiment of the present disclosure provides a data transmission method, which is corresponding to a transmit end in the data transmission method described in the foregoing embodiment corresponding to FIG. 1. Referring to FIG. 5, the data transmission method includes the following steps.

501. A second device determines, in a preset time period of a first subframe on a first time resource or a first time set of a subframe on a first time resource, a starting position of sending first information of a first serving cell, and sends the first information to a first device.

The first time set is a set of predefined starting positions of the first information in a subframe, and the first time set includes at least two elements. Optionally, the first information is used to indicate a starting position of a second time resource, so that the first device detects the first information in the preset time period of the first subframe on the first time resource or the first time set of the subframe on the first time resource.

Optionally, the first time resource includes a close period of the first serving cell, and the close period of the first serving cell is a time period in which the first serving cell does not preempt an unlicensed spectrum. The second time resource is included in an open period of the first serving cell, and the open period of the first serving cell is a time period in which the first serving cell occupies an unlicensed spectrum. Preferably, the data transmission method provided in this embodiment may be used to determine a moment of switching the first serving cell from the close period to the open period.

Preferably, the first serving cell is a cell on a license-exempt spectrum. The first information may be carried on a reference signal, a PDSCH, a PDCCH, or an EPDCCH. Further, optionally, the reference signal includes but is not limited to: a primary synchronization signal, a secondary synchronization signal, a cell-specific reference signal, a UE-specific reference signal used for data demodulation of an enhanced physical downlink shared channel, a demodulation reference signal used for enhanced physical downlink control channel EPDCCH demodulation, a positioning reference signal, a channel state information reference signal, and a discovery reference signal.

Specifically, optionally, in a first application scenario, in an example of LBE, the first device may detect the first information of the first serving cell in the first time set of the subframe on the first time resource. Certainly, the description herein is merely exemplary, and the present disclosure is not limited thereto.

Optionally, the first time set includes a starting moment of at least one OFDM symbol in a subframe, or the first time set includes a starting moment of at least 1/T OFDM symbols in a subframe, and T is an integer greater than 0.

Preferably, the first time set includes a starting position of the $(k+x)^{th}$ OFDM symbol in a subframe, where a value of k includes at least one of 3, 4, 5, 6, 8, 9, or 12, x represents a quantity of OFDM symbols occupied by a preamble sequence, a value of x is 0, 1, 2, 3, or 4, and $1 \leq k+x \leq 14$.

Alternatively, optionally, in a second application scenario, in an example of FBE, the first device detects the first information of the first serving cell in the first preset time period of the first subframe on the first time resource.

Certainly, the description herein is merely exemplary, and the present disclosure is not limited thereto.

Specifically, optionally, the first subframe is the first subframe in each frame period, the preset time period includes at least one orthogonal frequency division multiplexing OFDM symbol in the first subframe, and a frame period includes at least two subframes. The following lists two specific frame structures for description. Certainly, the description herein is merely exemplary, and the present disclosure is not limited thereto.

In a first frame structure, a frame period is an FFP in an FBE frame structure. The first subframe meets a formula: I mod F=offset, where I is a subframe index of the first subframe, F is a length of the fixed frame period FFP, and offset is an offset.

In a second frame structure, all subframes in each frame period are the first subframe, idle periods included in each frame period are distributed in each frame period at an even interval, a starting OFDM symbol m in the preset time period meets a formula: I mod X=offset+m, where I is a subframe index of the first subframe, X is a length of a frame period, and offset is an offset.

For different carriers, different sensing mechanisms may be used, or for different time periods of a same carrier, different sensing mechanisms may be used. A sensing mechanism of the first serving cell may include at least one of a sensing mechanism of frame based equipment FBE or a sensing mechanism of load based equipment LBE. When there are multiple serving cells, the sensing mechanism of the first serving cell may be different from that of another cell, or when the first serving cell includes multiple carriers, different sensing mechanisms may be used for the carriers.

In addition, optionally, regardless of the first application scenario such as an LBE scenario or the second application scenario such as an FBE scenario, after sending the first information of the first serving cell to the first device, the second device may further send third information to the first device, where the third information is used to indicate a starting position of the first information. In this way, the first device may first buffers the first information, and after receiving the third information, the first device detects the first information according to the starting position, of the first information, indicated by the third information.

Optionally, the third information may be carried in the first serving cell or a second serving cell, and a frequency of the second serving cell is different from that of the first serving cell. Preferably, the second serving cell is a cell on a licensed spectrum.

502. The second device determines a starting position of a second time resource according to the first information.

Optionally, the starting position of the second time resource may be the starting position of the first information, or the starting position of the second time resource may be a starting moment of the $n^{th}$ data transmission unit following the starting position of the first information, where n is a positive integer, the data transmission unit is 1/T OFDM symbols, and T is an integer greater than 0. Preferably, when the data transmission unit is a subframe, the starting position of the second time resource may be a starting moment of the first subframe following the starting position of the first information, or a starting moment of the first information may be used as the starting position of the second time resource.

503. The second device determines, in a second time set of a subframe on the second time resource, a starting position of sending second information of the first serving cell, and sends the second information to the first device.

The second device sends the second information to the first device, so that the first device detects the second information of the first serving cell in the second time set of the subframe on the second time resource, where the second time set is a set of predefined starting positions of the second information in a subframe, and the first time set and the second time set include at least one different element.

Optionally, the second information may be carried on a reference signal, a PDSCH, a PDCCH, or an EPDCCH. Preferably, the second information may be control information.

According to the data transmission method provided in this embodiment of the present disclosure, a second device determines, in a preset time period of a first subframe on a first time resource or a first time set of a subframe on a first time resource, a starting position of sending first information of a first serving cell, sends the first information to a first device, determines a starting position of a second time resource according to the first information, determines, in a second time set of a subframe on the second time resource, a starting position of sending second information of the first serving cell, and sends the second information to the first device, so that the first device can determine the starting position of the second time resource by detecting the first information. This resolves a prior-art problem that a receive end cannot correctly receive data because a starting moment of sending information on a license-exempt spectrum cannot be determined.

Figure 6:
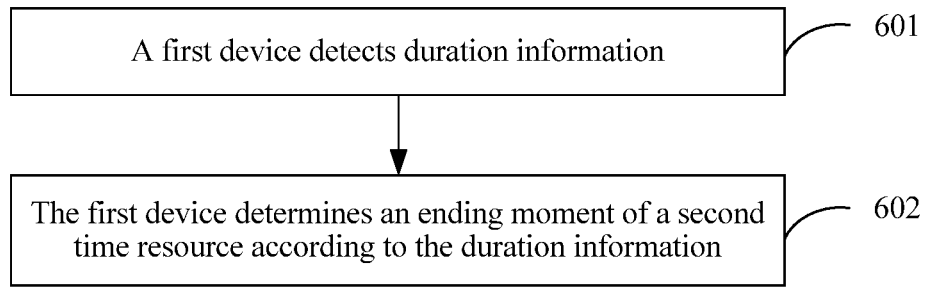
FIG. 6 is a schematic flowchart of another data transmission method according to an embodiment of the present disclosure.

With reference to the foregoing embodiments corresponding to FIG. 1 and FIG. 5, the data transmission methods described in the embodiments corresponding to FIG. 1 and FIG. 5 are used to determine a starting position of a second time resource. An embodiment of the present disclosure provides another data transmission method, which is used to determine an ending position of the second time resource. The data transmission method provided in this embodiment of the present disclosure may be executed after the data transmission method described in the embodiment corresponding to FIG. 1, that is, after step 103, or may be executed simultaneously with the data transmission method described in the embodiment corresponding to FIG. 1, and no limitation is imposed in the present disclosure. Referring to FIG. 6, the data transmission method includes the following steps.

601. A first device detects duration information.

The duration information is used to indicate a time length from a starting moment of the duration information to an ending moment of a second time resource. Optionally, the duration information includes information about a first length, and the first length is a length of the last subframe on the second time resource. The duration information may be carried on a control channel in a second subframe, the second subframe includes at least one of a subframe on the second time resource or a subframe that is in a second serving cell and is corresponding to the last subframe on the second time resource, and the second subframe further includes a subframe that is in the second serving cell and is corresponding to a subframe on the second time resource. That is, the duration information may be carried in the second serving cell in a cross-carrier scheduling manner, or may be carried in a first serving cell in a self-carrier scheduling manner. A subframe that is in the second serving cell and is corresponding to that in the first serving cell includes a subframe whose subframe index is the same as that of the first serving cell, or a subframe with a fixed offset.

The second serving cell may be a cell on a licensed spectrum. Preferably, the duration information is carried on a physical layer common control channel. Herein, it should be noted that a time length from a starting moment of the second time resource to the ending moment of the second time resource may be predefined or statically configured. Therefore, provided that the duration information may include only a starting position of the second time resource, the duration information may indicate the ending moment of the second time resource. The time length may be indicated by using an integral quantity of subframes, may be indicated by using an integral quantity of OFDM symbols, or is indicated by using an integral quantity of Ts, where Ts is a reciprocal of a sampling rate in an LTE system.

Three specific indication manners are listed in this embodiment. Certainly, only an example is given herein to describe how the duration information indicates the time length from the starting moment of the duration information to the ending moment of the second time resource, and it does not mean that the present disclosure is limited thereto.

Manner 1: A bitmap form is used. For example, m bits (bit) may be used to represent m different time lengths, and different time lengths are determined and indicated by setting each bit to 1 or 0. A time length unit may be predefined, such as millisecond, subframe, or quantity of OFDM symbols. In an example in which a time length is a subframe, assuming that the m bits "$X_1 X_2 X_3 \ldots X_m$" represent $L_1$ subframes, $L_2$ subframes, $L_3$ subframes, . . . , and $L_m$ subframes respectively from left to right, when $X_3$ in the M bits is 1 and other bits are 0, it may indicate that the time length from the starting moment of first information to the ending moment of the second time resource is $L_3$ subframes.

Manner 2: A binary encoding form is used. For example, a binary numeral represented by N bits is used to represent different time lengths. A time length unit may be predefined, such as millisecond, subframe, or quantity of OFDM symbols. In an example in which a time length is a subframe and N=2, four time lengths may be represented by using four binary numerals: 00, 01, 10, and 11, and the four binary numerals are corresponding to four time lengths: $Y_1$ subframes, $Y_2$ subframes, $Y_3$ subframes, and $Y_4$ subframes respectively.

Manner 3: An existing method for indicating a DwPTS included in a special subframe is used, and the information about the first length may be indicated in this manner. Time information may include a configuration index of a special subframe, and the length of the last subframe on the second time resource may be determined by using a one-to-one correspondence between the configuration index and the first length. As shown in Table 1, Table 1 shows the correspondence between the configuration index and the first length.

TABLE 1

| Configuration index | First length | |
| --- | --- | --- |
| | Normal cyclic prefix | Extended cyclic prefix |
| 0 | 3 | 3 |
| 1 | 9 | 8 |
| 2 | 10 | 9 |
| 3 | 11 | 10 |
| 4 | 12 | 3 |
| 5 | 3 | 8 |
| 6 | 9 | 9 |
| 7 | 10 | |
| 8 | 11 | |

Preferably, the second time resource is included in an open period of the first serving cell, and the open period of the first serving cell is a time period in which the first serving cell occupies an unlicensed spectrum. With reference to the embodiment corresponding to FIG. 1, the data transmission method described in the embodiment corresponding to FIG. 1 may be used to determine a moment of switching the first serving cell from a close period to the open period, and the data transmission method provided in this embodiment may be used to determine a moment of switching the first serving cell from the open period to the close period.

602. The first device determines an ending moment of a second time resource according to the duration information.

Optionally, the first device detects at least two pieces of duration information of the first serving cell, and the first device determines the ending moment of the second time resource according to the last piece of detected duration information. For example, in the open period of the first serving cell, the duration information may be carried on a control channel transmitted in each subframe, and is used to indicate the time length from the starting moment of sending the duration information to the ending moment of the second time resource. The duration information may indicate a same starting moment or different starting moments of the second time resource.

Alternatively, optionally, the duration information is carried in the last subframe on the second time resource, and the first device needs to perform detection only once. In this case, before the first device detects the duration information, it may be considered that the first serving cell is in an open period, and the first device still detects a control channel in each subframe in the first serving cell, to determine whether data is scheduled to the first device, or performs measurement on the first serving cell. After the first device detects the duration information, it may be considered that the first serving cell releases a license-exempt spectrum after a moment indicated by the duration information, and the first device stops data scheduling information detection on the first serving cell.

After the duration information is detected, a new data packet may be received. Consequently, the second time resource is extended, that is, the ending moment of the second time resource is delayed. Therefore, the ending moment of the second time resource is determined according to the last piece of detected duration information, or the duration information is carried in the last subframe on the second time resource. This ensures accuracy of determining the ending moment of the second time resource.

It should be noted that because there is a delay between preparing data sending and performing data sending by the first serving cell, a method for notifying the ending moment of the second time resource for one time does not have real-time performance, and cannot accurately reflect actual transmission duration of the first serving cell on a license-exempt spectrum, thereby affecting data transmission efficiency. Exemplarily, data sent at a T3 moment by a serving cell or a base station to which the serving cell belongs is prepared by the base station at a T1 moment (data scheduling preparation at a higher layer) and a T2 moment (data scheduling preparation at a physical layer) in advance. Assuming that the serving cell preempts a license-exempt spectrum resource at the T3 moment, but does not preempt a license-exempt spectrum resource before the T3 moment, the serving cell or a cell combined with the serving cell in a CA manner or another manner notifies data transmission duration of the serving cell on the license-exempt spectrum resource at the T3 moment. With reference to a feature of advanced data preparation by the base station, the data transmission duration notified at the T3 moment is determined by the serving cell or the base station to which the serving cell belongs at the T1 moment according to a service load status, that is, if data arrives at the serving cell or the base station to which the serving cell belongs between the T1 moment and the T3 moment, actual transmission duration notified at the T3 moment cannot include the data arrived at the T1 moment to the T3 moment. Therefore, a license-exempt spectrum resource cannot be effectively used, license-exempt spectrum data transmission efficiency is affected, and consequently, UE incorrectly determines an ending moment of transmitting data by the serving cell on a license-exempt spectrum. According to the method provided in this embodiment of the present disclosure, the ending moment of the second time resource is notified for multiple times or is notified for only the last time, so as to mitigate a problem that notified duration is not accurate because of a delay between data preparation and data sending by the first serving cell.

According to the data transmission method provided in this embodiment of the present disclosure, a first device detects duration information, where the duration information is used to indicate a time length from a starting moment of the duration information to an ending moment of a second time resource; and determines the ending moment of the second time resource according to the duration information. This resolves a prior-art problem of a data receiving error caused because a receive end cannot determine an ending moment of sending information on a license-exempt spectrum.

Figure 7:
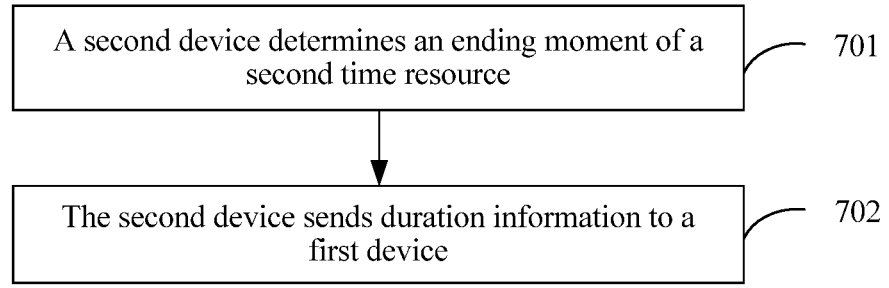
FIG. 7 is a schematic flowchart of another data transmission method according to another embodiment of the present disclosure.

With reference to the foregoing embodiments corresponding to FIG. 1 and FIG. 5, the data transmission methods described in the embodiments corresponding to FIG. 1 and FIG. 5 are used to determine a starting position of a second time resource. Another embodiment of the present disclosure provides another data transmission method, which is used to determine an ending position of the second time resource, and is corresponding to a transmit end in the data transmission method described in the foregoing embodiment corresponding to FIG. 6. The data transmission method provided in this embodiment of the present disclosure may be executed after the data transmission method described in the embodiment corresponding to FIG. 5, that is, after step 502, or may be executed simultaneously with the data transmission method described in the embodiment corresponding to FIG. 5, and no limitation is imposed in the present disclosure. Referring to FIG. 7, the data transmission method includes the following steps:

701. A second device determines an ending moment of a second time resource.

702. The second device sends duration information to a first device.

The duration information is used to indicate a time length from a starting moment of the duration information to the ending moment of the second time resource, so that the first device determines the ending moment of the second time resource according to the duration information.

Optionally, the duration information includes information about a first length, and the first length is a length of the last subframe on the second time resource. The duration information may be carried on a control channel in a second subframe, the second subframe includes at least one of a subframe on the second time resource or a subframe that is in a second serving cell and is corresponding to the last subframe on the second time resource, and the second serving cell may be a cell on a licensed spectrum. Preferably, the duration information is carried on a physical layer common control channel. It should be noted that the duration information may be predefined or semi-statically configured.

Optionally, the second device sends at least two pieces of duration information to the first device, and the first device may determine the ending moment of the second time resource according to the last piece of detected duration information.

Alternatively, optionally, the second device adds the duration information to the last subframe on the second time resource, and sends the last subframe to the first device, and the first device only needs to perform detection once.

After the duration information is detected, the second device may send a new data packet to the first device, and consequently, the second time resource is extended, that is, the ending moment of the second time resource is delayed. Therefore, the ending moment of the second time resource is determined according to the last piece of detected duration information, or the duration information is carried in the last subframe on the second time resource. This ensures accuracy of determining the ending moment of the second time resource.

According to the data transmission method provided in this embodiment of the present disclosure, a second device determines an ending moment of a second time resource, and the second device sends duration information to a first device, where the duration information is used to indicate a time length from a starting moment of the duration information to the ending moment of the second time resource, so that the first device can determine the ending moment of the second time resource according to the duration information. This resolves a prior-art problem of a data receiving error caused because a receive end cannot determine an ending moment of sending information on a license-exempt spectrum.

Figure 8:
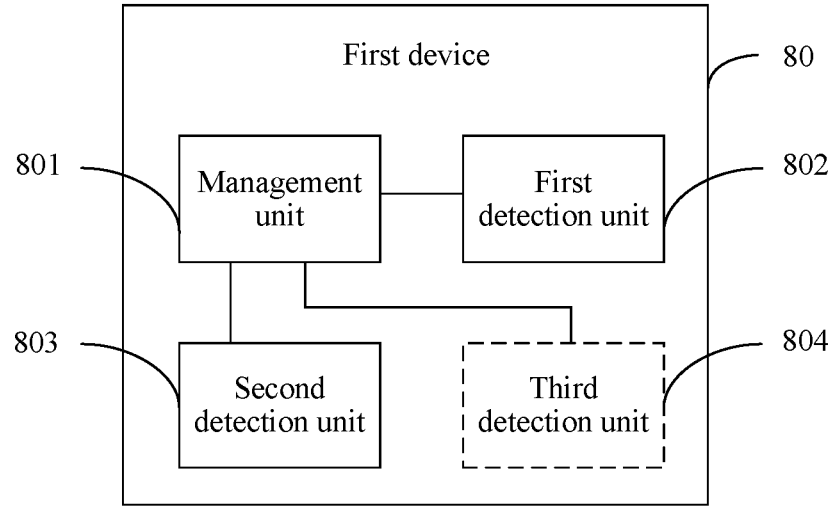
FIG. 8 is a schematic structural diagram of a first device according to an embodiment of the present disclosure.

Based on the foregoing embodiment corresponding to FIG. 1, an embodiment of the present disclosure provides a first device, configured to execute the data transmission method described in the foregoing embodiment corresponding to FIG. 1. Referring to FIG. 8, the first device 80 includes: a management unit 801, a first detection unit 802, and a second detection unit 803.

The first detection unit 802 is configured to detect first information of a first serving cell in a preset time period of a first subframe on a first time resource or a first time set of a subframe on a first time resource, where the first time set is a set of predefined starting positions of the first information in a subframe, and the first time set includes at least two elements.

The management unit 801 is configured to determine a starting position of a second time resource according to the first information detected by the first detection unit 802.

The second detection unit 803 is configured to detect second information of the first serving cell in a second time set of a subframe on the second time resource, where the second time set is a set of predefined starting positions of the second information in a subframe, and the first time set and the second time set include at least one different element.

Preferably, the first time resource includes a close period of the first serving cell, and the close period of the first serving cell is a time period in which the first serving cell does not preempt an unlicensed spectrum. The second time resource is included in an open period of the first serving cell, and the open period of the first serving cell is a time period in which the first serving cell occupies an unlicensed spectrum.

Optionally, the first detection unit 802 is further configured to: detect third information, and determine a starting position of the first information according to the detected third information, where the third information is received after the first information; and detect the received first information according to the starting position of the first information in the preset time period of the first subframe on the first time resource or the first time set of the subframe on the first time resource.

Optionally, in an application scenario, the first subframe in each frame period is the first subframe, the preset time period includes at least one orthogonal frequency division multiplexing OFDM symbol in the first subframe, and a frame period includes at least two subframes. Further, optionally, the frame period is a fixed frame period FFP in a frame based equipment FBE frame structure.

The first subframe meets a formula: I mod F=offset, where I is a subframe index of the first subframe, F is a length of the fixed frame period FFP, and offset is an offset.

Alternatively, optionally, in another application scenario, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

Optionally, the first time set includes a starting moment of at least one orthogonal frequency division multiplexing OFDM symbol in a subframe; or the first time set includes a starting moment of at least 1/T OFDM symbols in a subframe, and T is an integer greater than 0.

Optionally, the first time set includes a starting position of the $(k+x)^{th}$ OFDM symbol in a subframe.

A value of k includes at least one of 3, 4, 5, 6, 8, 9, or 12, x represents a quantity of OFDM symbols occupied by a preamble sequence, a value of x is 0, 1, 2, 3, or 4, and 1≤k+x≤14.

Optionally, the starting position of the second time resource is a starting moment of the $n^{th}$ data transmission unit following the starting position of the first information, n is a positive integer, the data transmission unit is 1/T OFDM symbols, and T is an integer greater than 0.

In addition, optionally, the first device 80 further includes a third detection unit 804, configured to detect duration information.

The management unit 801 is further configured to determine an ending moment of the second time resource according to the duration information detected by the third detection unit 804.

Preferably, the duration information includes information about a first length, and the first length is a length of the last subframe on the second time resource.

Optionally, the first device 80 detects at least two pieces of duration information of the first serving cell.

The management unit 801 is further configured to determine the ending moment of the second time resource according to the last piece of detected duration information.

Optionally, the duration information is carried on a control channel in a second subframe, and the second subframe includes at least one of a subframe on the second time resource or a subframe that is in a second serving cell and is corresponding to the last subframe on the second time resource.

Preferably, the duration information is carried in the last subframe on the second time resource. The duration information may be carried on a physical layer common control channel.

The first device provided in this embodiment of the present disclosure detects first information of a first serving cell in a preset time period of a first subframe on a first time resource or a first time set of a subframe on a first time resource, determines a starting position of a second time resource according to the first information, and detects second information of the first serving cell in a second time set of a subframe on the second time resource. This resolves a prior-art problem that a receive end cannot correctly receive data because a starting moment of sending information on a license-exempt spectrum cannot be determined.

Figure 9:
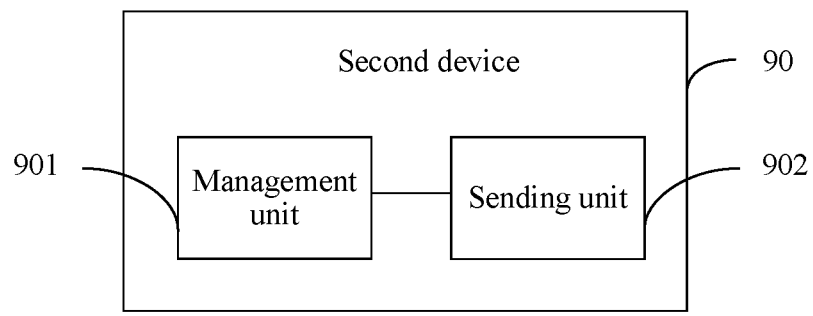
FIG. 9 is a schematic structural diagram of a second device according to an embodiment of the present disclosure.

Based on the foregoing embodiment corresponding to FIG. 5, an embodiment of the present disclosure provides a second device, configured to execute the data transmission method described in the foregoing embodiment corresponding to FIG. 5. Referring to FIG. 9, the second device 90 includes: a management unit 901 and a sending unit 902.

The management unit 901 is configured to determine, in a preset time period of a first subframe on a first time resource or a first time set of a subframe on a first time resource, a starting position of sending first information of a first serving cell, where the first time set is a set of predefined starting positions of the first information in a subframe, and the first time set includes at least two elements.

The sending unit 902 is configured to send the first information to a first device.

The management unit 901 is further configured to: determine a starting position of a second time resource according to the first information; and determine, in a second time set of a subframe on the second time resource, a starting position of sending second information of the first serving cell, where the second time set is a set of predefined starting positions of the second information in a subframe, and the first time set and the second time set include at least one different element.

The sending unit 901 is further configured to send the second information to the first device.

Preferably, the first time resource includes a close period of the first serving cell, and the close period of the first serving cell is a time period in which the first serving cell does not preempt an unlicensed spectrum. The second time resource is included in an open period of the first serving cell, and the open period of the first serving cell is a time period in which the first serving cell occupies an unlicensed spectrum.

Optionally, the sending unit 901 is further configured to send third information to the first device, where the third information is used to indicate the starting position of the first information.

Optionally, in an application scenario, the first subframe in each frame period is the first subframe, the preset time period includes at least one orthogonal frequency division multiplexing OFDM symbol in the first subframe, and a frame period includes at least two subframes. Further, optionally, the frame period is a fixed frame period FFP in a frame based equipment FBE frame structure.

The first subframe meets a formula: I mod F=offset, where I is a subframe index of the first subframe, F is a length of the fixed frame period FFP, and offset is an offset.

Alternatively, optionally, in another application scenario, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

Optionally, the first time set includes a starting moment of at least one orthogonal frequency division multiplexing OFDM symbol in a subframe; or the first time set includes a starting moment of at least 1/T OFDM symbols in a subframe, and T is an integer greater than 0.

Optionally, the first time set includes a starting position of the $(k+x)^{th}$ OFDM symbol in a subframe.

A value of k includes at least one of 3, 4, 5, 6, 8, 9, or 12, x represents a quantity of OFDM symbols occupied by a preamble sequence, a value of x is 0, 1, 2, 3, or 4, and $1 \le k+x \le 14$.

Optionally, the starting position of the second time resource is a starting moment of the $n^{th}$ data transmission unit following the starting position of the first information, n is a positive integer, the data transmission unit is 1/T OFDM symbols, and T is an integer greater than 0.

In addition, optionally, the management unit 901 is further configured to determine an ending moment of the second time resource.

The sending unit 901 is further configured to send duration information to the first device, where the duration information is used to indicate a time length from a starting moment of the duration information to the ending moment of the second time resource.

Preferably, the duration information includes information about a first length, and the first length is a length of the last subframe on the second time resource.

Optionally, the sending unit 901 is further configured to send at least two pieces of duration information of the first serving cell to the first device.

Optionally, the duration information is carried on a control channel in a second subframe, and the second subframe includes at least one of a subframe on the second time resource or a subframe that is in a second serving cell and is corresponding to the last subframe on the second time resource.

Preferably, the duration information is carried in the last subframe on the second time resource. The duration information may be carried on a physical layer common control channel.

The second device provided in this embodiment of the present disclosure determines, in a preset time period of a first subframe on a first time resource or a first time set of a subframe on a first time resource, a starting position of sending first information of a first serving cell, sends the first information to a first device, determines a starting position of a second time resource according to the first information, determines, in a second time set of a subframe on the second time resource, a starting position of sending second information of the first serving cell, and sends the second information to the first device, so that the first device can determine the starting position of the second time resource by detecting the first information. This resolves a prior-art problem that a receive end cannot correctly receive data because a starting moment of sending information on a license-exempt spectrum cannot be determined.

Figure 10:
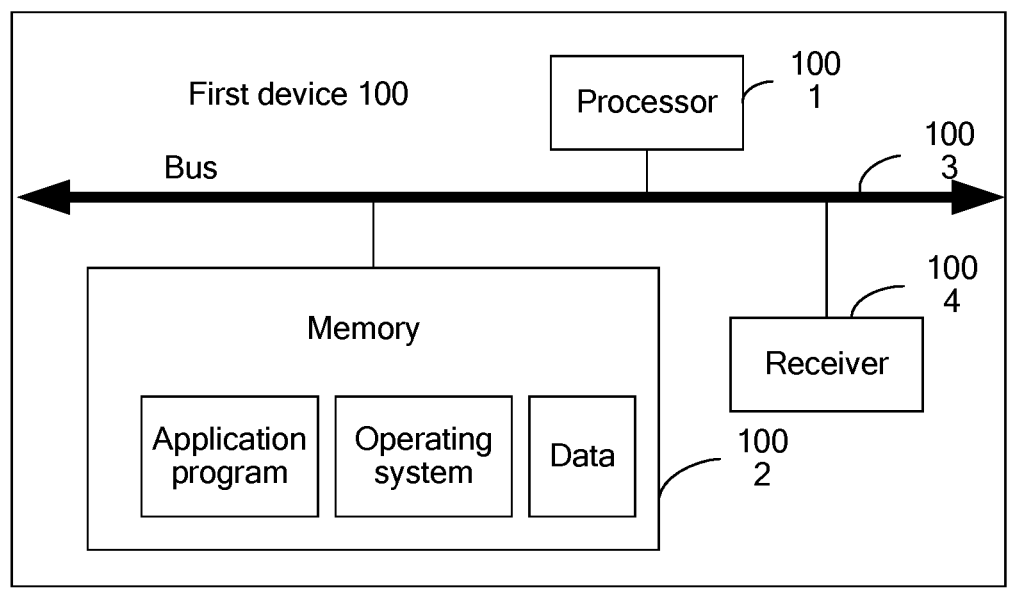
FIG. 10 is a schematic structural diagram of a first device according to another embodiment of the present disclosure.

Based on the foregoing embodiment corresponding to FIG. 1, another embodiment of the present disclosure provides a first device, configured to execute the data transmission method described in the foregoing embodiment corresponding to FIG. 1. Referring to FIG. 10, the first device 100 includes: at least one processor 1001, a memory 1002, a bus 1003, and a receiver 1004. The at least one processor 1001, the memory 1002, and the receiver 1004 are connected and communicate with each other by using the bus 1003.

The bus 1003 may be an ISA (industry standard architecture) bus, a PCI (peripheral component interconnect) bus, an EISA (extended industry standard architecture) bus, or the like. The bus 1003 may be categorized into an address bus, a data bus, a control bus, and the like. For ease of denotation, the bus 1003 is represented by using only one bold line in FIG. 10; however, it does not indicate that there is only one bus or only one type of bus.

The memory 1002 is configured to store application program code for executing the solutions in the present disclosure, where the application program code for executing the solutions in the present disclosure is stored in the memory, and execution thereof is controlled by the processor 1001.

The memory may be a read-only memory (ROM) or a static storage device of another type that may store static information and an instruction, a random access memory (RAM), or a dynamic storage device of another type that may store information and an instruction; or may be an electrically erasable programmable read-only memory (EEPROM), a compact disc read-only memory (CD-ROM) or other compact disk storage, optical disc storage (including a compact disc, a laser disc, an optical disc, a digital versatile disc, a blue-ray disc, and the like), a disk storage medium or another disk storage device, or any other medium that can be used to carry or store expected program code in a form of an instruction or a data structure and can be accessed by a computer, without being limited thereto though. These memories are connected to the processor by using the bus.

The processor 1001 may be a central processing unit 1001 (CPU), or an application-specific integrated circuit (ASIC), or one or more integrated circuits configured to implement this embodiment of the present disclosure.

The processor 1001 is configured to invoke the program code in the memory 1002. In a possible implementation manner, when the foregoing application program is executed by the processor 1001, the following functions are implemented.

The processor 1001 is configured to detect first information of a first serving cell in a preset time period of a first subframe on a first time resource or a first time set of a subframe on a first time resource, where the first time set is a set of predefined starting positions of the first information in a subframe, and the first time set includes at least two elements.

The processor 1001 is further configured to determine a starting position of a second time resource according to the detected first information.

The processor 1001 is further configured to detect second information of the first serving cell in a second time set of a subframe on the second time resource, where the second time set is a set of predefined starting positions of the second information in a subframe, and the first time set and the second time set include at least one different element.

Preferably, the first time resource includes a close period of the first serving cell, and the close period of the first serving cell is a time period in which the first serving cell does not preempt an unlicensed spectrum. The second time resource is included in an open period of the first serving cell, and the open period of the first serving cell is a time period in which the first serving cell occupies an unlicensed spectrum.

Optionally, the processor 1001 is further configured to: detect third information, and determine a starting position of the first information according to the detected third information, where the third information is received after the first information; and detect the received first information according to the starting position of the first information in the preset time period of the first subframe on the first time resource or the first time set of the subframe on the first time resource.

Optionally, in an application scenario, the first subframe in each frame period is the first subframe, the preset time period includes at least one orthogonal frequency division multiplexing OFDM symbol in the first subframe, and a frame period includes at least two subframes. Further, optionally, the frame period is a fixed frame period FFP in a frame based equipment FBE frame structure.

The first subframe meets a formula: I mod F=offset, where I is a subframe index of the first subframe, F is a length of the fixed frame period FFP, and offset is an offset.

Alternatively, optionally, in another application scenario, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

Optionally, the first time set includes a starting moment of at least one orthogonal frequency division multiplexing OFDM symbol in a subframe; or the first time set includes a starting moment of at least 1/T OFDM symbols in a subframe, and T is an integer greater than 0.

Optionally, the first time set includes a starting position of the $(k+x)^{th}$ OFDM symbol in a subframe.

A value of k includes at least one of 3, 4, 5, 6, 8, 9, or 12, x represents a quantity of OFDM symbols occupied by a preamble sequence, a value of x is 0, 1, 2, 3, or 4, and $1 \leq k+x \leq 14$.

Optionally, the starting position of the second time resource is a starting moment of the $n^{th}$ data transmission unit following the starting position of the first information, n is a positive integer, the data transmission unit is 1/T OFDM symbols, and T is an integer greater than 0.

In addition, optionally,
the processor 1001 is further configured to: detect duration information; and determine an ending moment of the second time resource according to the detected duration information.

Preferably, the duration information includes information about a first length, and the first length is a length of the last subframe on the second time resource.

Optionally, the first device 100 detects at least two pieces of duration information of the first serving cell.

The processor 1001 is further configured to determine the ending moment of the second time resource according to the last piece of detected duration information.

Optionally, the duration information is carried on a control channel in a second subframe, and the second subframe includes at least one of a subframe on the second time resource or a subframe that is in a second serving cell and is corresponding to the last subframe on the second time resource.

Preferably, the duration information is carried in the last subframe on the second time resource. The duration information may be carried on a physical layer common control channel.

The first device provided in this embodiment of the present disclosure detects first information of a first serving cell in a preset time period of a first subframe on a first time resource or a first time set of a subframe on a first time resource, determines a starting position of a second time resource according to the first information, and detects second information of the first serving cell in a second time set of a subframe on the second time resource. This resolves a prior-art problem that a receive end cannot correctly receive data because a starting moment of sending information on a license-exempt spectrum cannot be determined.

Figure 11:
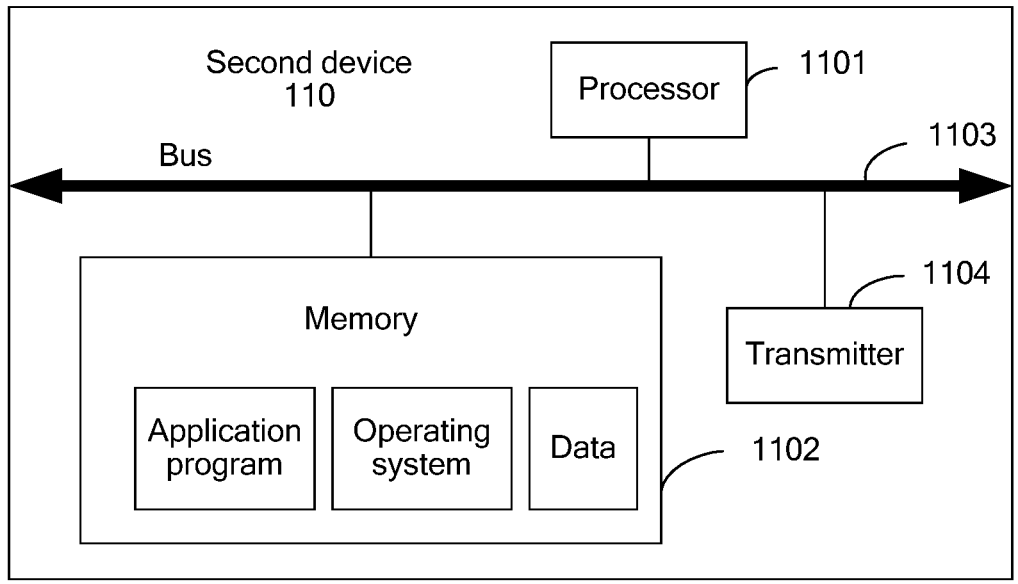
FIG. 11 is a schematic structural diagram of a second device according to another embodiment of the present disclosure.

Based on the foregoing embodiment corresponding to FIG. 5, another embodiment of the present disclosure provides a second device, configured to execute the data transmission method described in the foregoing embodiment corresponding to FIG. 5. Referring to FIG. 11, the second device 110 includes: at least one processor 1101, a memory 1102, a bus 1103, and a transmitter 1104. The at least one processor 1101, the memory 1102, and the transmitter 1104 are connected and communicate with each other by using the bus 1103.

The bus 1103 may be an ISA (industry standard architecture) bus, a PCI (peripheral component interconnect) bus, an EISA (extended industry standard architecture) bus, or the like. The bus 1103 may be categorized into an address bus, a data bus, a control bus, and the like. For ease of denotation, the bus 1103 is represented by using only one bold line in FIG. 11; however, it does not indicate that there is only one bus or only one type of bus.

The memory 1102 is configured to store application program code for executing the solutions in the present disclosure, where
the application program code for executing the solutions in the present disclosure is stored in the memory, and execution thereof is controlled by the processor 1101.

The memory may be a read-only memory (ROM) or a static storage device of another type that may store static information and an instruction, a random access memory (RAM), or a dynamic storage device of another type that may store information and an instruction; or may be an electrically erasable programmable read-only memory (EE-PROM), a compact disc read-only memory (CD-ROM) or other compact disk storage, optical disc storage (including a compact disc, a laser disc, an optical disc, a digital versatile disc, a blue-ray disc, and the like), a disk storage medium or another disk storage device, or any other medium that can be used to carry or store expected program code in a form of an instruction or a data structure and can be accessed by a computer, without being limited thereto though. These memories are connected to the processor by using the bus.

The processor 1101 may be a central processing unit 1101 (CPU for short), or an application-specific integrated circuit (ASIC for short), or one or more integrated circuits configured to implement this embodiment of the present disclosure.

The processor 1101 is configured to invoke the program code in the memory 1102. In a possible implementation manner, when the foregoing application program is executed by the processor 1101, the following functions are implemented.

The processor 1101 is configured to determine, in a preset time period of a first subframe on a first time resource or a first time set of a subframe on a first time resource, a starting position of sending first information of a first serving cell, where the first time set is a set of predefined starting positions of the first information in a subframe, and the first time set includes at least two elements.

The transmitter 1104 is configured to send the first information to a first device.

The processor 1101 is further configured to: determine a starting position of a second time resource according to the first information; and determine, in a second time set of a subframe on the second time resource, a starting position of sending second information of the first serving cell, where the second time set is a set of predefined starting positions of the second information in a subframe, and the first time set and the second time set include at least one different element.

The transmitter 1104 is further configured to send the second information to the first device.

Preferably, the first time resource includes a close period of the first serving cell, and the close period of the first serving cell is a time period in which the first serving cell does not preempt an unlicensed spectrum. The second time resource is included in an open period of the first serving cell, and the open period of the first serving cell is a time period in which the first serving cell occupies an unlicensed spectrum.

Optionally, the transmitter 1104 is further configured to send third information to the first device, where the third information is used to indicate the starting position of the first information.

Optionally, in an application scenario, the first subframe in each frame period is the first subframe, the preset time period includes at least one orthogonal frequency division multiplexing OFDM symbol in the first subframe, and a frame period includes at least two subframes. Further, optionally, the frame period is a fixed frame period FFP in a frame based equipment FBE frame structure.

The first subframe meets a formula: I mod F=offset, where I is a subframe index of the first subframe, F is a length of the fixed frame period FFP, and offset is an offset.

Alternatively, optionally, in another application scenario, all subframes in each frame period are the first subframe, idle periods included in each frame period are distributed in each frame period at an even interval, an index m of a starting OFDM symbol in the preset time period meets a formula: I mod X=offset+m, where I is a subframe index of the first subframe, X is a length of a frame period, and offset is an offset.

Optionally, the first time set includes a starting moment of at least one orthogonal frequency division multiplexing OFDM symbol in a subframe; or the first time set includes a starting moment of at least 1/T OFDM symbols in a subframe, and T is an integer greater than 0.

Optionally, the first time set includes a starting position of the $(k+x)^{th}$ OFDM symbol in a subframe.

A value of k includes at least one of 3, 4, 5, 6, 8, 11, or 12, x represents a quantity of OFDM symbols occupied by a preamble sequence, a value of x is 0, 1, 2, 3, or 4, and $1 \leq k+x \leq 14$.

Optionally, the starting position of the second time resource is a starting moment of the $n^{th}$ data transmission unit following the starting position of the first information, n is a positive integer, the data transmission unit is 1/T OFDM symbols, and T is an integer greater than 0.

In addition, optionally, the processor 1101 is further configured to determine an ending moment of the second time resource.

The transmitter 1104 is further configured to send duration information to the first device, where the duration information is used to indicate a time length from a starting moment of the duration information to the ending moment of the second time resource.

Preferably, the duration information includes information about a first length, and the first length is a length of the last subframe on the second time resource.

Optionally, the transmitter 1104 is further configured to send at least two pieces of duration information of the first serving cell to the first device.

Optionally, the duration information is carried on a control channel in a second subframe, and the second subframe includes at least one of a subframe on the second time resource or a subframe that is in a second serving cell and is corresponding to the last subframe on the second time resource.

Preferably, the duration information is carried in the last subframe on the second time resource. The duration information may be carried on a physical layer common control channel.

The second device provided in this embodiment of the present disclosure determines, in a preset time period of a first subframe on a first time resource or a first time set of a subframe on a first time resource, a starting position of sending first information of a first serving cell, sends the first information to a first device, determines a starting position of a second time resource according to the first information, determines, in a second time set of a subframe on the second time resource, a starting position of sending second information of the first serving cell, and sends the second information to the first device, so that the first device can determine the starting position of the second time resource by detecting the first information. This resolves a prior-art problem that a receive end cannot correctly receive data because a starting moment of sending information on a license-exempt spectrum cannot be determined.

Figure 12:
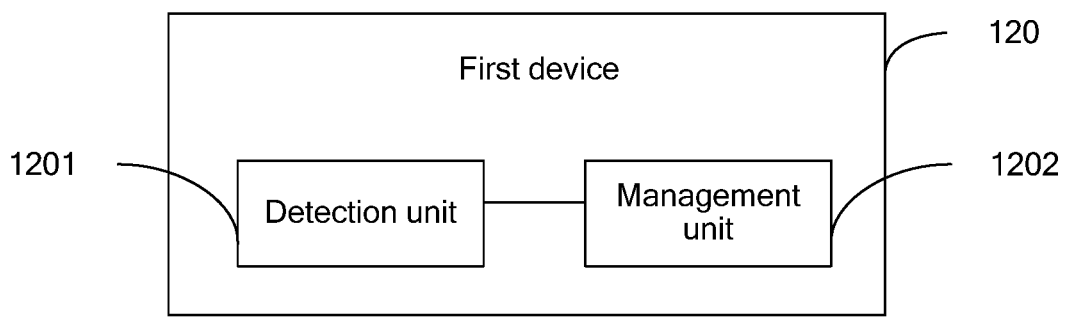
FIG. 12 is a schematic structural diagram of another first device according to an embodiment of the present disclosure.

Based on the foregoing embodiment corresponding to FIG. 6, an embodiment of the present disclosure provides another first device, configured to execute the data transmission method described in the foregoing embodiment corresponding to FIG. 6. Referring to FIG. 12, the first device 120 includes: a detection unit 1201 and a management unit 1202.

The detection unit 1201 is configured to detect duration information.

The management unit 1202 is configured to determine an ending moment of a second time resource according to the duration information detected by the detection unit 1201.

Optionally, the second time resource is included in an open period of a first serving cell, and the open period of the first serving cell is a time period in which the first serving cell occupies an unlicensed spectrum.

Optionally, the duration information includes information about a first length, and the first length is a length of the last subframe on the second time resource.

Optionally, the first device detects at least two pieces of duration information of the first serving cell.

The management unit 1202 is further configured to determine the ending moment of the second time resource according to the last piece of detected duration information.

Optionally, the duration information is carried on a control channel in a second subframe, and the second subframe includes at least one of a subframe on the second time resource or a subframe that is in a second serving cell and is corresponding to the last subframe on the second time resource.

Optionally, the duration information is carried in the last subframe on the second time resource. The duration information may be carried on a physical layer common control channel.

The first device provided in this embodiment of the present disclosure detects duration information, where the duration information is used to indicate a time length from a starting moment of the duration information to an ending moment of a second time resource; and determines the ending moment of the second time resource according to the duration information. This resolves a prior-art problem of a data receiving error caused because a receive end cannot determine an ending moment of sending information on a license-exempt spectrum.

Figure 13:
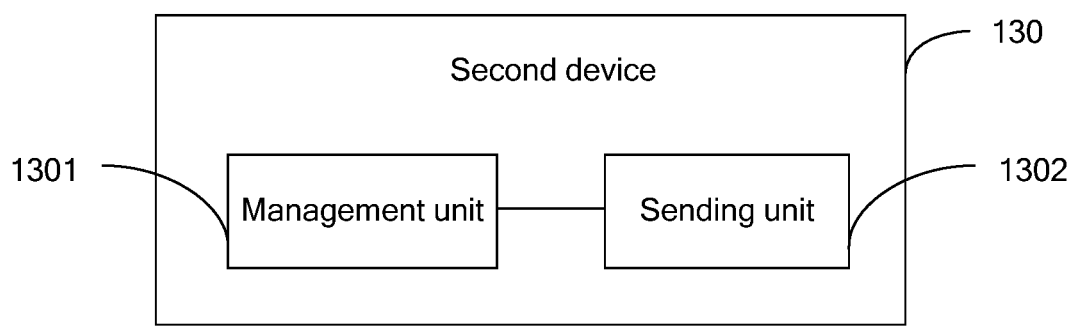
FIG. 13 is a schematic structural diagram of another second device according to an embodiment of the present disclosure.

Based on the foregoing embodiment corresponding to FIG. 7, an embodiment of the present disclosure provides another second device, configured to execute the data transmission method described in the foregoing embodiment corresponding to FIG. 7. Referring to FIG. 13, the second device 130 includes: a management unit 1301 and a sending unit 1302.

The management unit 1301 is configured to determine an ending moment of a second time resource.

The sending unit 1302 is configured to send duration information to a first device, where the duration information is used to indicate a time length from a starting moment of the duration information to the ending moment of the second time resource.

Optionally, the second time resource is included in an open period of a first serving cell, and the open period of the first serving cell is a time period in which the first serving cell occupies an unlicensed spectrum.

Optionally, the duration information includes information about a first length, and the first length is a length of the last subframe on the second time resource.

Optionally, the sending unit 1302 is further configured to send at least two pieces of duration information of the first serving cell to the first device.

Optionally, the duration information is carried on a control channel in a second subframe, and the second subframe includes at least one of a subframe on the second time resource or a subframe that is in a second serving cell and is corresponding to the last subframe on the second time resource.

Optionally, the duration information is carried in the last subframe on the second time resource. The duration information may be carried on a physical layer common control channel.

The second device provided in this embodiment of the present disclosure determines an ending moment of a second time resource, and the second device sends duration information to a first device, where the duration information is used to indicate a time length from a starting moment of the duration information to the ending moment of the second time resource, so that the first device can determine the ending moment of the second time resource according to the duration information. This resolves a prior-art problem of a data receiving error caused because a receive end cannot determine an ending moment of sending information on a license-exempt spectrum.

Figure 14:
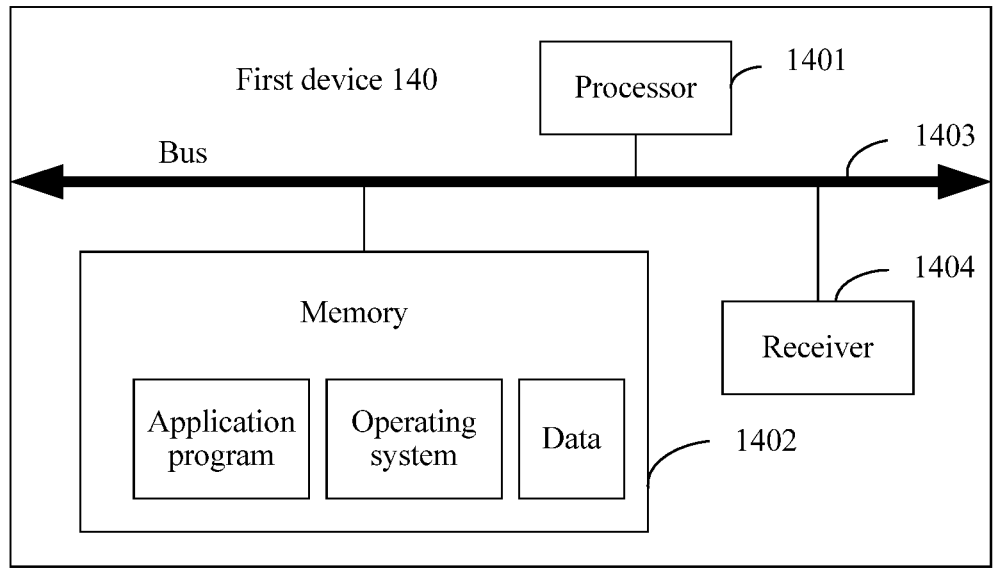
FIG. 14 is a schematic structural diagram of another first device according to another embodiment of the present disclosure.

Based on the foregoing embodiment corresponding to FIG. 6, another embodiment of the present disclosure provides another first device, configured to execute the data transmission method described in the foregoing embodiment corresponding to FIG. 6. Referring to FIG. 14, the first device 140 includes: at least one processor 1401, a memory 1402, a bus 1403, and a receiver 1404. The at least one processor 1401, the memory 1402, and the receiver 1404 are connected and communicate with each other by using the bus 1403.

The bus 1403 may be an ISA (industry standard architecture) bus, a PCI (peripheral component interconnect) bus, an EISA (extended industry standard architecture) bus, or the like. The bus 1403 may be categorized into an address bus, a data bus, a control bus, and the like. For ease of denotation, the bus 1403 is represented by using only one bold line in FIG. 14; however, it does not indicate that there is only one bus or only one type of bus.

The memory 1402 is configured to store application program code for executing the solutions in the present disclosure, where the application program code for executing the solutions in the present disclosure is stored in the memory, and execution thereof is controlled by the processor 1401.

The memory may be a read-only memory (ROM) or a static storage device of another type that may store static information and an instruction, a random access memory (RAM), or a dynamic storage device of another type that may store information and an instruction; or may be an electrically erasable programmable read-only memory (EEPROM), a compact disc read-only memory (CD-ROM) or other compact disk storage, optical disc storage (including a compact disc, a laser disc, an optical disc, a digital versatile disc, a blue-ray disc, and the like), a disk storage medium or another disk storage device, or any other medium that can be used to carry or store expected program code in a form of an instruction or a data structure and can be accessed by a computer, without being limited thereto though. These memories are connected to the processor by using the bus.

The processor 1401 may be a central processing unit 1401 (CPU), or an application-specific integrated circuit (ASIC), or one or more integrated circuits configured to implement this embodiment of the present disclosure.

The processor 1401 is configured to invoke the program code in the memory 1402. In a possible implementation manner, when the foregoing application program is executed by the processor 1401, the following functions are implemented.

The processor 1401 is configured to: detect duration information; and determine an ending moment of a second time resource according to the detected duration information.

Optionally, the second time resource is included in an open period of a first serving cell, and the open period of the first serving cell is a time period in which the first serving cell occupies an unlicensed spectrum.

Optionally, the duration information includes information about a first length, and the first length is a length of the last subframe on the second time resource.

Optionally, the first device detects at least two pieces of duration information of the first serving cell.

The processor 1401 is further configured to determine the ending moment of the second time resource according to the last piece of detected duration information.

Optionally, the duration information is carried on a control channel in a second subframe, and the second subframe includes at least one of a subframe on the second time resource or a subframe that is in a second serving cell and is corresponding to the last subframe on the second time resource.

Optionally, the duration information is carried in the last subframe on the second time resource. The duration information may be carried on a physical layer common control channel.

The first device provided in this embodiment of the present disclosure detects duration information, where the duration information is used to indicate a time length from a starting moment of the duration information to an ending moment of a second time resource; and determines the ending moment of the second time resource according to the duration information. This resolves a prior-art problem of a data receiving error caused because a receive end cannot determine an ending moment of sending information on a license-exempt spectrum.

Figure 15:
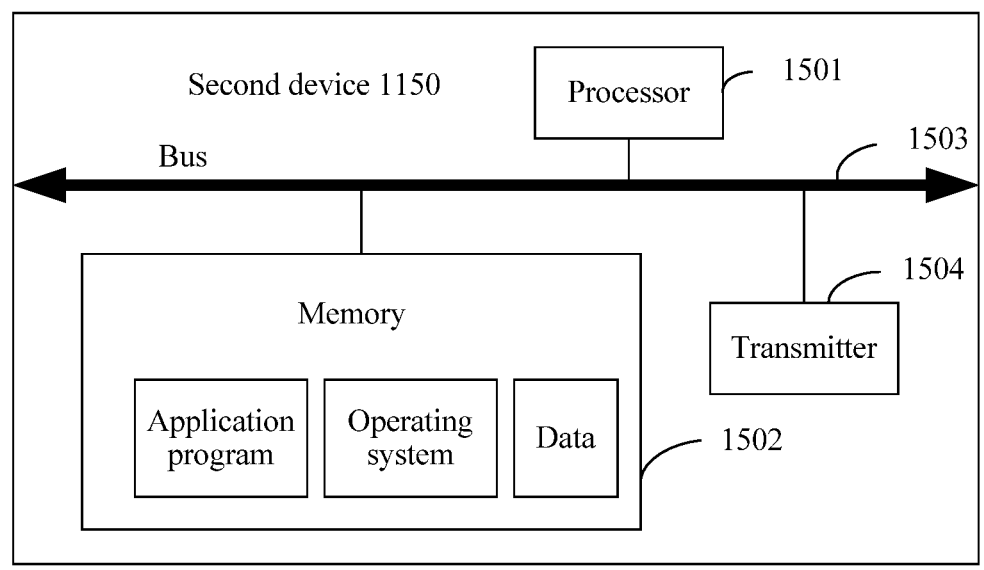
FIG. 15 is a schematic structural diagram of another second device according to another embodiment of the present disclosure.

Based on the foregoing embodiment corresponding to FIG. 7, another embodiment of the present disclosure provides another second device, configured to execute the data transmission method described in the foregoing embodiment corresponding to FIG. 7. Referring to FIG. 15, the second device 150 includes: at least one processor 1501, a memory 1502, a bus 1503, and a transmitter 1504. The at least one processor 1501, the memory 1502, and the transmitter 1504 are connected and communicate with each other by using the bus 1503.

The bus 1503 may be an ISA (industry standard architecture) bus, a PCI (peripheral component interconnect) bus, an EISA (extended industry standard architecture) bus, or the like. The bus 1503 may be categorized into an address bus, a data bus, a control bus, and the like. For ease of denotation, the bus 1503 is represented by using only one bold line in FIG. 15; however, it does not indicate that there is only one bus or only one type of bus.

The memory 1502 is configured to store application program code for executing the solutions in the present disclosure, where the application program code for executing the solutions in the present disclosure is stored in the memory, and execution thereof is controlled by the processor 1501.

The memory may be a read-only memory (ROM) or a static storage device of another type that may store static information and an instruction, a random access memory (RAM), or a dynamic storage device of another type that may store information and an instruction; or may be an electrically erasable programmable read-only memory (EEPROM), a compact disc read-only memory (CD-ROM) or other compact disk storage, optical disc storage (including a compact disc, a laser disc, an optical disc, a digital versatile disc, a blue-ray disc, and the like), a disk storage medium or another disk storage device, or any other medium that can be used to carry or store expected program code in a form of an instruction or a data structure and can be accessed by a computer, without being limited thereto though. These memories are connected to the processor by using the bus.

The processor 1501 may be a central processing unit 1501 (CPU), or an application-specific integrated circuit (ASIC), or one or more integrated circuits configured to implement this embodiment of the present disclosure.

The processor 1501 is configured to invoke the program code in the memory 1502. In a possible implementation manner, when the foregoing application program is executed by the processor 1501, the following functions are implemented.

The processor 1501 is configured to determine an ending moment of a second time resource.

The transmitter 1504 is configured to send duration information to a first device, where the duration information is used to indicate a time length from a starting moment of the duration information to the ending moment of the second time resource.

Optionally, the second time resource is included in an open period of a first serving cell, and the open period of the first serving cell is a time period in which the first serving cell occupies an unlicensed spectrum.

Optionally, the duration information includes information about a first length, and the first length is a length of the last subframe on the second time resource.

Optionally, the transmitter 1504 is further configured to send at least two pieces of duration information of the first serving cell to the first device.

Optionally, the duration information is carried on a control channel in a second subframe, and the second subframe includes at least one of a subframe on the second time resource or a subframe that is in a second serving cell and is corresponding to the last subframe on the second time resource.

Optionally, the duration information is carried in the last subframe on the second time resource. The duration information may be carried on a physical layer common control channel.

The second device provided in this embodiment of the present disclosure determines an ending moment of a second time resource, and the second device sends duration information to a first device, where the duration information is used to indicate a time length from a starting moment of the duration information to the ending moment of the second time resource, so that the first device can determine the ending moment of the second time resource according to the duration information. This resolves a prior-art problem of a data receiving error caused because a receive end cannot determine an ending moment of sending information on a license-exempt spectrum.

Figure 16:
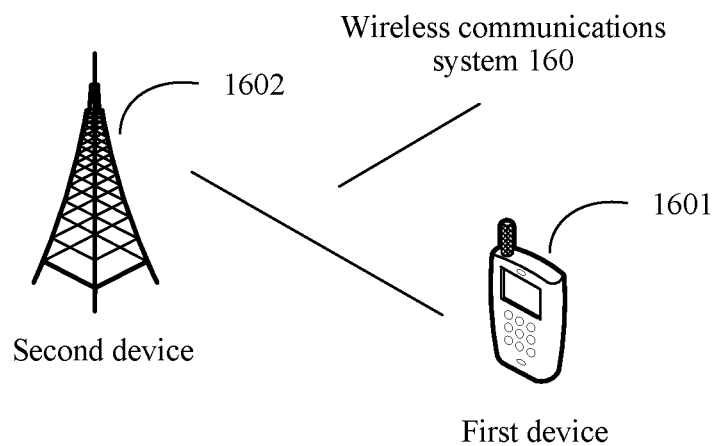
FIG. 16 is a schematic structural diagram of a wireless communications system according to an embodiment of the present disclosure.

Based on the foregoing embodiments corresponding to FIG. 1 and FIG. 5, an embodiment of the present disclosure provides a wireless communications system, configured to execute the data transmission methods described in the foregoing embodiments corresponding to FIG. 1 and FIG. 5. Referring to FIG. 16, the wireless communications system 160 includes: a first device 1601 and a second device 1602.

The first device 1601 is the first device described in the embodiment corresponding to FIG. 8, and the second device 1602 is the second device described in the embodiment corresponding to FIG. 9.

Alternatively, the first device 1601 is the first device described in the embodiment corresponding to FIG. 10, and the second device 1602 is the second device described in the embodiment corresponding to FIG. 11.

According to the wireless communications system provided in this embodiment of the present disclosure, a first device detects first information of a first serving cell in a preset time period of a first subframe on a first time resource or a first time set of a subframe on a first time resource, determines a starting position of a second time resource according to the first information, and detects second information of the first serving cell in a second time set of a subframe on the second time resource. This resolves a prior-art problem that a receive end cannot correctly receive data because a starting moment of sending information on a license-exempt spectrum cannot be determined.

Figure 17:
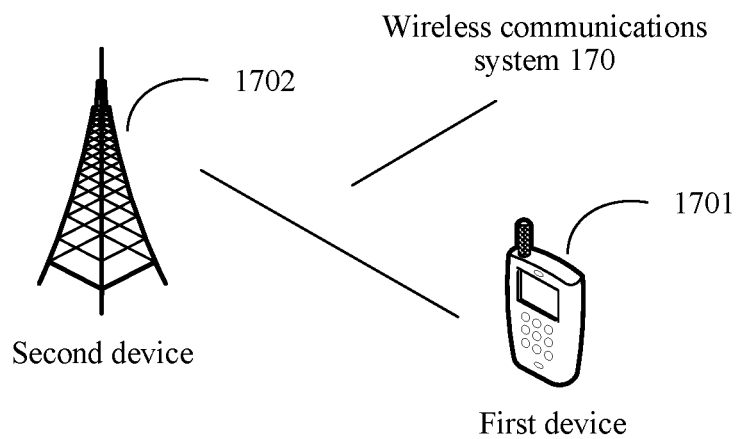
FIG. 17 is a schematic structural diagram of another wireless communications system according to an embodiment of the present disclosure.

Based on the foregoing embodiments corresponding to FIG. 6 and FIG. 7, an embodiment of the present disclosure provides another wireless communications system, configured to execute the data transmission methods described in the foregoing embodiments corresponding to FIG. 6 and FIG. 7. Referring to FIG. 17, the wireless communications system 170 includes: a first device 1701 and a second device 1702.

The first device 1701 is the first device described in the embodiment corresponding to FIG. 12, and the second device 1702 is the second device described in the embodiment corresponding to FIG. 13.

Alternatively, the first device 1701 is the first device described in the embodiment corresponding to FIG. 14, and the second device 1702 is the second device described in the embodiment corresponding to FIG. 15.

According to the wireless communications system provided in this embodiment of the present disclosure, a first device detects duration information, where the duration information is used to indicate a time length from a starting moment of the duration information to an ending moment of a second time resource; and determines the ending moment of the second time resource according to the duration information. This resolves a prior-art problem of a data receiving error caused because a receive end cannot determine an ending moment of sending information on a license-exempt spectrum.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM (random access memory), a ROM (read-only memory), an EEPROM (electrically erasable programmable read-only memory), a CD-ROM compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present disclosure includes a CD (compact disc), a laser disc, an optical disc, a DVD disc (digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device, comprising:
a non-transitory memory storing program instructions; and
at least one processor coupled to the non-transitory memory, wherein the instructions, when executed by the at least one processor, cause the device to:
detect at least two pieces of duration information of a first serving cell, wherein each piece of duration information of the at least two pieces of duration information respectively comprises information about a length of a last subframe on a time resource, and wherein the time resource is comprised in a time period in which the first serving cell occupies an unlicensed spectrum; and
determine an ending moment of the time resource according to a last piece of detected duration information of the at least two pieces of duration information.

2. The device according to claim 1, wherein:
the at least two pieces of duration information are carried on a physical layer common control channel.

3. A device, comprising:
a non-transitory memory storing program instructions; and
at least one processor coupled to the non-transitory memory, wherein the instructions, when executed by the at least one processor, cause the device to:
determine an ending moment of a time resource, wherein the time resource is comprised in a time period in which a first serving cell occupies an unlicensed spectrum; and
send at least two pieces of duration information to a terminal device, wherein each piece of duration information of the at least two pieces of duration information respectively comprises information about a length of a last subframe on the time resource.

4. The device according to claim 3, wherein:
the at least two pieces of duration information are carried on a physical layer common control channel.

5. A data transmission method, comprising:
detecting, by a device, at least two pieces of duration information of a first serving cell, wherein each piece of duration information of the at least two pieces of duration information respectively comprises information about a length of a last subframe on a time resource, and wherein the time resource is comprised in a time period in which the first serving cell occupies an unlicensed spectrum; and
determining, by the device, an ending moment of the time resource according to a last piece of duration information of the at least two pieces of duration information.

6. The method according to claim 5, wherein:
the at least two pieces of duration information are carried on a physical layer common control channel.

7. A data transmission method, comprising:
determining, by a device, an ending moment of a time resource, wherein the time resource is comprised in a time period in which a first serving cell occupies an unlicensed spectrum; and
sending, by the device, at least two pieces of duration information to a terminal device, wherein each piece of duration information of the at least two pieces of duration information respectively comprises information about a length of a last subframe on the time resource.

8. The method according to claim 7, wherein:
the at least two pieces of duration information are carried on a physical layer common control channel.

* * * * *